(12) United States Patent
Robb

(10) Patent No.: US 8,527,387 B2
(45) Date of Patent: *Sep. 3, 2013

(54) ASSET INVESTMENT TOOL

(75) Inventor: Paul H. Robb, Tucson, AZ (US)

(73) Assignee: Living Legacy System, L.L.C., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,515

(22) Filed: Jul. 26, 2012

(65) Prior Publication Data

US 2013/0085967 A1    Apr. 4, 2013

Related U.S. Application Data

(63) Continuation-in-part of application No. 13/008,753, filed on Jan. 18, 2011.

(60) Provisional application No. 61/511,947, filed on Jul. 26, 2011.

(51) Int. Cl.
*G06Q 40/00* (2012.01)
(52) U.S. Cl.
USPC .......................................................... 705/36 R
(58) Field of Classification Search
USPC .................................................... 705/35–40
See application file for complete search history.

(56) References Cited

U.S. PATENT DOCUMENTS

| 2002/0198827 A1 | 12/2002 | van Leeuwen |
| 2007/0156559 A1* | 7/2007 | Wolzenski et al. ............. 705/35 |
| 2008/0306799 A1 | 12/2008 | Sopko, III et al. |
| 2009/0204446 A1 | 8/2009 | Simon et al. |

FOREIGN PATENT DOCUMENTS

KR     1020070071497     7/2007

* cited by examiner

*Primary Examiner* — Olabode Akintola
(74) *Attorney, Agent, or Firm* — Dale F. Regelman; Quarles & Brady LLP

(57) ABSTRACT

A method to maximize a post-mortem asset disbursement, the method receives information about one or more assets owned by an asset holder, selects a life expectancy from the group consisting of a single life, a joint life, and both a single life and a joint life, and sets an expected aggregate expenditure of the asset holder over the life expectancy period. The method further calculates a first investment corpus, a first investment corpus life expectancy value, and calculates a first estimated post-mortem tax liability. The method further sets a value for carve out funds deducted from the first investment corpus, wherein said carve out funds take into account both gift tax and estate tax exclusions, calculates a second investment corpus, a second investment corpus life expectancy value, and a second estimated post-mortem tax liability. The method then determines a value for life insurance proceeds paid at end of life expectancy.

14 Claims, 60 Drawing Sheets

| Financial Professional Resources | | |
|---|---|---|
| Description | View | Download |
| Pilot Overview | | |
| LegacyTrax Overview | View | Download |
| User Agreement | View | Download |
| Important Information (Must be Given to Client) | View | Download |
| Getting Started | | |
| Client and Alliance Prospecting Guidelines | View | Download |
| Education and Training | | |
| LegacyTrax Key Concepts | View | Download |
| Sample Presentation Script | View | Download |
| Tutorial | View | Download |
| Sample Presentation Video | View | Download |
| Sample Legacy Assets Surplus Report | View | Download |
| Sample Living Assets Deficit Report | View | Download |
| Sales and Marketing | | |
| Client Brochure | View | Download |
| Financial Professional Brochure- Dillian Micus | View | Download |
| Financial Professional Brochure- Mark Neely | View | Download |
| Financial Professional Brochure- John Passananti | View | Download |
| Financial Professional Brochure- Mark Roony | View | Download |
| Client Fact Finder | View | Download |

Figure 5b

| Description | View | Download |
|---|---|---|
| Pilot Overview | | |
| LegacyTrax Overview | View | Download |
| User Agreement | View | Download |
| Important Information (Must be Given to Client | View | Download |
| Getting Started | | |
| Client and Alliance Prospecting Guidelines | View | Download |
| Education and Training | | |
| LegacyTrax Key Concepts | View | Download |
| Sample Presentation Script | View | Download |
| Tutorial | View | Download |
| Sample Presentation Video | View | Download |
| Sample Legacy Assets Surplus Report | View | Download |
| Sample Living Assets Deficit Report | View | Download |
| Sales and Marketing | | |
| Client Brochure | View | Download |
| Financial Professional Brochure-Dillian Micus | View | Download |
| Financial Professional Brochure-Mark Neely | View | Download |
| Legacy Assets "Surplus Analysis" Key Take-Aways | View | Download |
| Living Assets "Deficit Analysis" Key Take-Aways | View | Download |
| Client Fact Finder | View | Download |
| Certified Legacy Advisor (CLA) | | |
| CLA Program Overview | View | Download |

Existing Reports

Select Reports by User [TimJ]

| Report Description | Submitted By | Edit | Delete | View | Print |
|---|---|---|---|---|---|
| Ed and Edna Estateowner | TimJ | Edit | Delete | View Report | Print Report |
| Pete and Pam Potential | TimJ | Edit | Delete | View Report | Print Report |

Family Members — 600

| Member Type | Name | Gender | Date of Birth | Smoker | |
|---|---|---|---|---|---|
| Primary | Ed Estateowner | Male | 6/1/1959 | | - |
| Spouse | Edna Estateowner | Female | 12/1/1957 | | - |
| *Select* | | Male | | | + |

Net Assets — 602          618

| Asset Type | Amount | Rate of Return | Income Producing ☑ | |
|---|---|---|---|---|
| Cash & Equiv | $3,000,000 | 1% | ☑ | - |
| Stocks | $8,500,000 | 6% | ☑ | - |
| Bonds | $4,200,000 | 4% | ☑ | - |
| Real Estate | $6,000,000 | 3% | ☑ | - |
| Others | $1,000,000 | 4% | ☑ | - |
| Business Holdings | $14,000,000 | 8% | ☑ | - |
| Retirement | $1,500,000 | 5% | ☑ | - |
| *Select* | | | | + |

Default Values — 620      See Complete Instructions — 638

| Legacy Carve Out | Net Annual Lifestyle Needs | Rate Income Tax | Rate Estate Tax | Life Expectancy | Inflation | Annual Premium | Face Amount |
|---|---|---|---|---|---|---|---|
| $10,000,000 | $250,000 | 38% | 45% | 33 | 2.50% | $272,539 | $50,000,000 |

Default Values Key            MOVE    CLOSE

Legacy Carve Out: Begin with an amount in the range of 33% to 50% of the estimated estate tax. The Carve-Out can be adjusted mid-presentation based upon case design or client and advisor interaction.

Net Annual Lifestyle Needs: The after-tax annual income desired.

Rate Income Tax: Combined federal and state marginal rates.

Life Expectancy: For Legacy Assets Surplus cases: Use joint Life expectancy for primary & spouse analysis. Use Single Life expectancy for primary only analysis. For Living Income Deficit cases: Use life expectancy of survivor.

Inflation: The rate by which Net Annual Living Income needs is increased annually.

Annual Premium and Face Amount: Prepare Joint Life illustration for Joint Life case or Single Life illustration for Single Life case based on age(s) and anticipated rate class(es). Using proposed Face Amount, solve for the minimum level annual premium needed to fund coverage to age 100 or other desired maximum age. Enter resulting Premium and Face Amount from illustration into data fields. (This will establish a Face Amount to Premium ratio for use in analysis.)

Figure 6b

| Liabilities | Life Insurances & Incomes |

↙ 800

Report Description | Ed and Edna Estateowner

— 802

Life Insurance Policies

| Policy Number | |
| Life Insurance Policy | -Select- |
| Product | |
| Face Amount | |
| Company | |
| Premium | |
| Cash Value | |
| Year Issued | |
| Date Input | |
| Insured Name(s) | |
| Owner | |
| Beneficiary | |

Add Policy Data    Cancel

Incomes

| Income Type | Amount | |
|---|---|---|
| -Select- | | ✚ |

Figure 8

| Rapid Report Input | Additional Financial Data | Existing Planning | Financial Team Members | Goals | Special Considerations |

Report Description | Ed and Edna Estateowner

*Estate Plan* — 902

Planning Type

-Select-

Rate

Total Plan Type

-Select-

Total Number of Gifting Beneficiaries: 0

Verbal Overview

Documents

Add New Document

Select File: [ ] Browse

Cancel    Save

| Select Scenario | | | | | |
|---|---|---|---|---|---|
| Introduction | Living Legacy Model | Roles Perspective | Existing Default Analysis | | Save as New Scenario |
| Observations | Lifestyle Assets | Succession Capital Legacy Assets | Paradox | | |

Ed Estateowner, please consider a corporate analogy ...

- Client's asset base is an entity of it's own – A.K.A. UCorp.
- The typical high net worth client will only spend a fraction of their total assets in their lifetime, whereby the remaining assets will survive them as Legacy Assets.

| Select Scenario | | | | Save as New Scenario |
|---|---|---|---|---|
| Introduction | Living Legacy Model | Roles Perspective | Existing Default Analysis | |
| Observations | Lifestyle Assets | Succession Capital Legacy Assets | Paradox | |

Relative to Living Assets to be used for lifetime needs:

- Client is like a current shareholder of UCorp.
- Client takes an emotional approach to decisions with conservatism and self-interest in mind.

Figure 19

Relative to Legacy Assets:

- Client is more like a CEO.
- The family CEO manages assets for the future benefit of "family shareholders"
- Like a trustee, fiduciary or long-term steward of family assets.
- Requires logical approach to decisions, i.e., a pragmatic, long-term, strategic planning focus Tabs: Select Scenario | Introduction | Living Legacy Model | Roles Perspective | Existing Default Analysis | Observations | Lifestyle Assets | Succession Capital Legacy Assets | Paradox Save as New Scenario

[ Tabs: Select Scenario | Living Legacy Model | Roles Perspective | Existing Default Analysis ]
[ Tabs: Introduction | Observations | Lifestyle Assets | Succession Capital Legacy Assets | Paradox ]
[ Button: Save as New Scenario ]

2100

Paradox: Client must wear both hats.

- Client objectives and choices may seem contradictory.
- Client must put Shareholder hat in the closet while wearing CEO hat.
- Client must evaluate possible projected performance of Legacy Assets using Living Legacy model.

Figure 21

LIVING ASSETS DETAILS

| Year | Living Income | Living Assets |
|---|---|---|
| 1 | $250,000 | $7,136,060 |
| 2 | $256,250 | $7,116,971 |
| 3 | $262,656 | $7,090,596 |
| 4 | $269,223 | $7,056,520 |
| 5 | $275,953 | $7,014,307 |
| 6 | $282,852 | $6,963,501 |
| 7 | $289,923 | $6,903,630 |
| 8 | $297,171 | $6,834,196 |
| 9 | $304,601 | $6,754,683 |
| 10 | $312,216 | $6,664,552 |
| 11 | $320,021 | $6,563,240 |
| 12 | $328,022 | $6,450,159 |
| 13 | $336,222 | $6,324,696 |
| 14 | $344,628 | $6,186,213 |
| 15 | $353,243 | $6,034,044 |

Figure 25

Surplus LegacyTrax Analysis

Name: Ed Estateowner   Edna Estateowner
Age: 52   54

| Net Worth | Amount | Income Producing | ROR |
|---|---|---|---|
| Stocks | $8,500,000 | ☒ | 6% |
| Bonds | $4,200,000 | ☒ | 4% |
| Cash & Equiv | $3,000,000 | | 1% |
| Retirements | $1,500,000 | ☒ | 5% |
| Real Estate | $6,000,000 | ☒ | 3% |
| Business Holdings | $14,000,000 | | 8% |
| Others | $1,000,000 | ☒ | 4% |
| Total | $38,200,000 | ☒ | 5.56% |

[ While Living ]   [ As Legacy ]

Living Legacy Model

Private Legacy Assets

Public Legacy Assets (Taxes)

☐ Show Carve Out

| | Amount | Gross Income |
|---|---|---|
| Legacy Carve Out | $0 | $0 |
| Private Legacy Assets | $21,010,000 | $1,167,650 |
| Public Legacy Assets (Taxes) | $17,190,000 | |

Legacy Carve Out:   $10,000,000

[ Proceed ]

| Assets | Analysis | Results | Illustrated | Observations |

Illustrated

Name: Ed Estateowner    Edna Estateowner
Age  50                 52

| Gross ROR | 5.56% | Estate Tax | 45% |
|---|---|---|---|
| Income Tax | 38% | Life Expectancy | 33 |

Default-Shows Annualized Rate of Return

Current Scenario

| Year | Age | Net Carve Out Income (Start of Year) @ 38% Tax Rate | Net Carve Out Earnings (End of Year) @ 3.45% Tax Rate | Cumulative Reinvested Carve Out Income (End of Year) @ 3.45% Tax Rate | Estate Tax @ 45% Tax Rate | Reinvested Carve Out Income Net to Heirs |
|---|---|---|---|---|---|---|
| 1 | 50/52 | $344,720 | $11,883 | $356,603 | $160,471 | $196,132 |
| 2 | 61/63 | $344,720 | $24,176 | $725,499 | $326,475 | $399,024 |
| 3 | 62/64 | $344,720 | $36,893 | $1,107,112 | $498,200 | $608,912 |
| 4 | 63/65 | $344,720 | $50,048 | $1,501,880 | $675,846 | $826,034 |
| 5 | 64/66 | $344,720 | $63,656 | $1,910,256 | $859,615 | $1,050,641 |
| ... | | | | | | |
| 10 | 59/61 | $344,720 | $139,057 | $4,173,259 | $1,877,967 | $2,295,292 |
| | | $3,447,200 | $869,920 | | | |
| 33 | 82/84 | $344,720 | $710,115 | $21,309,902 | $9,589,456 | $11,720,446 |
| 38 | 87/89 | $344,720 | $904,902 | $27,155,242 | $12,219,859 | $14,935,383 |
| | | $13,099,360 | $14,991,978 | | | |
| 50 | 99/101 | $344,720 | $1,632,017 | $42,283,447 | $20,688,472 | $25,295,910 |
| | | $17,236,000 | $30,323,211 | | | |

<<Prev    Next>>

Figure 30

| Assets | Analysis | Results | Illustrated | Observations |

Name: Ed Estateowner   Edna Estateowner
Age   50                52

| Gross ROR | 5.56% | Estate Tax | 45% | Illustrated Default-Shows Annualized Rate of Return |
| Income Tax | 38% | Life Expectancy | 33 | |

<<Prev    Next>>

Current Scenario — Current Scenario

| Year | Age | Net Carve Out Income (Start of Year) @ 38% Tax Rate | Net Carve Out Earnings (End of Year) @ 3.45% Tax Rate | Cumulative Reinvested Carve Out Income (End of Year) @ 3.45% Tax Rate | Estate Tax @ 45% Tax Rate | Reinvested Carve Out Income Net to Heirs | |
|---|---|---|---|---|---|---|---|
| 1 | 50/52 | $344,720 | $11,883 | $356,603 | $160,471 | $196,132 | -43.00% |
| 2 | 51/53 | $344,720 | $24,176 | $725,499 | $326,475 | $399,024 | -31.30% |
| 3 | 52/54 | $344,720 | $36,893 | $1,107,112 | $498,200 | $608,912 | -24.10% |
| 4 | 53/55 | $344,720 | $50,048 | $1,501,880 | $675,846 | $826,034 | -19.40% |
| 5 | 54/56 | $344,720 | $63,656 | $1,910,256 | $859,615 | $1,050,841 | 15.90% |
| 10 | 59/61 | $3,447,200 | $139,067 | $4,173,259 | $1,877,967 | $2,295,292 | -7.55% |
| 33 | 82/84 | $344,720 | $710,116 | $21,309,902 | $9,589,456 | $11,720,446 | 0.30% |
| 38 | 87/89 | $344,720 | $904,902 | $27,155,242 | $12,219,859 | $14,935,383 | 0.80% |
| 50 | 99/101 | $13,099,360 | $14,991,978 | $45,974,382 | $20,688,472 | $25,285,910 | 1.60% |
| | | $17,236,000 | $30,323,211 | | | | |

| Assets | Anaylsis | Results | Illustrated | Observations |
|---|---|---|---|---|

Observations

- Now that you, the family CEO, are aware of this result in advance, planning and asset allocation adjustments can be made to improve efficiency in the rate of return.

| Introduction | Living Legacy Model | Roles Perspective | Existing Default Analysis | LegacyTrax | LegacyTrax Carve Out | Revised Design Results |

| Observations | Legacy Carve Out |

3300

Your asset allocation decisions have always been
based on sound criteria:

- Diversification of Assets and Strategies
- Minimization of Taxes
- Seeking maximization of Rate of Return

| | | Illustrated | Considerations | Conclusion | | | | | |
|---|---|---|---|---|---|---|---|---|---|
Name: Ed Estateowner
Age 50

Ed Estateowner / Edna Estateowner / 52

| | Gross ROR | 5.56% | Estate Tax | 45% | Legacy Carve Out | $10,000,000 | <<Prev | Next>> |
|---|---|---|---|---|---|---|---|---|
| | Income Tax | 38% | Life Expectancy | 33 | | | | |

| Year | Age | Net Carve Out Income (Start of Year) | Cumulative Reinvested Carve Out Income Net Estate Tax (End of Year) | Annualized Rate Of Return | Net Carve Out Income (Start of Year) | Cumulative Carve Out Income (End of Year) | Net Annualized Rate Of Return (End of Year) | LegacyTrax Leveraged Carve Out Maturity Value |
|---|---|---|---|---|---|---|---|---|
| 1 | 50/52 | $344,720 | $196,132 | -43.00% | $344,720 | $356,603 | 3.45% | $63,242,325 |
| 2 | 51/53 | $344,720 | $399,024 | -31.30% | $344,720 | $725,489 | 3.45% | $63,242,325 |
| 3 | 52/54 | $344,720 | $608,912 | -24.10% | $344,720 | $1,107,085 | 3.45% | $63,242,325 |
| 4 | 53/55 | $344,720 | $826,034 | -19.40% | $344,720 | $1,501,830 | 3.45% | $63,242,325 |
| 5 | 54/56 | $344,720 | $1,050,641 | 15.90% | $344,720 | $1,910,177 | 3.45% | $63,242,325 |
| ... | | | | | | | | |
| 10 | 59/61 | $344,720 | $2,295,292 | -7.40% | $344,720 | $4,172,917 | 3.45% | $63,242,325 |
| | | $3,447,200 | | | | | | |
| 33 | 82/84 | $344,720 | $11,726,446 | 0.30% | $344,720 | $21,303,766 | 3.45% | $63,242,325 |
| 38 | 87/89 | $344,720 | $14,935,383 | 0.80% | $344,720 | $27,146,067 | 3.45% | $63,242,325 |
| | | $13,099,360 | | | | | | |
| 50 | 99/101 | $344,720 | $25,285,910 | 1.60% | $344,720 | $45,953,022 | 3.45% | $63,242,325 |
| | | $17,236,000 | | | | | | |

3502 — Default Analysis
3604 — LegacyTrax Carve Out
3608
3600

| Illustrated | Considerations | Conclusion | | | |
|---|---|---|---|---|---|
| Gross ROR | 5.56% | Estate Tax | 45% | | Legacy Carve Out $10,000,000 |
| Income Tax | 38% | Life Expectancy | 33 | | |

Name: Ed Estateowner    Edna Estateowner   Illustrated
Age:  50                52

<<Prev    Next>>

| | | Default Analysys | | | LegacyTrax Carve Out | | LegacyTrax Leveraged | |
|---|---|---|---|---|---|---|---|---|
| Year | Age | Net Carve Out Income (Start of Year) | Cumulative Reinvested Carve Out Income Net Estate Tax (End of Year) | Annualized Rate Of Return | Net Carve Out Income (Start of Year) | Cumulative Carve Out Income (End of Year) | Net Annualized Rate Of Return (End of Year) | Maturity Value |
| 1 | 50/52 | $344,720 | $196,132 | -43.00% | $344,720 | $356,603 | 3.45% | $63,242,325 | 999.99% |
| 2 | 51/53 | $344,720 | $399,024 | -31.30% | $344,720 | $725,489 | 3.45% | $63,242,325 | >999.99% |
| 3 | 52/54 | $344,720 | $608,912 | -24.10% | $344,720 | $1,107,085 | 3.45% | $63,242,325 | 431.24% |
| 4 | 53/55 | $344,720 | $826,034 | -19.40% | $344,720 | $1,501,830 | 3.45% | $63,242,325 | 237.76% |
| 5 | 54/56 | $344,720 | $1,050,641 | 15.90% | $344,720 | $1,910,177 | 3.45% | $63,242,325 | 157.50% |
| ... | | | | | | | | | |
| 10 | 59/61 | $344,720 | $2,295,292 | -7.40% | $344,720 | $4,172,917 | 3.45% | $63,242,325 | 51.40% |
| | | $3,447,200 | | | | | | | |
| 33 | 82/84 | $344,720 | $11,726,446 | 0.30% | $344,720 | $21,303,766 | 3.45% | $63,242,325 | 8.70% |
| 38 | 87/89 | $344,720 | $14,935,383 | 0.80% | $344,720 | $27,146,067 | 3.45% | $63,242,325 | 6.97% |
| | | $13,099,360 | | | | | | | |
| 50 | 99/101 | $344,720 | $25,285,910 | 1.60% | $344,720 | $45,953,022 | 3.45% | $63,242,325 | 4.45% |
| | | $17,236,000 | | | | | | | |

3802   3804

*3900*

| Illustrated | Considerations | Conclusion |

Considerations

Compare the default allocation of Legacy Assets to the revised LegacyTrax Legacy.

- What is the appropriate conclusion from your family's perspective?
- Not so much a question of "if" but rather "how much" should be allocated to the LegaxyTrax Legacy Carve-Out.

LegacyTrax Legacy as an insurance strategy!

- A specialized life insurance strategy using newly developed insurance products.
    - Income and estate tax free if properly implemented.
    - Target NET annualized return of 6-9% at life expectancy.
- Makes compelling sense when making decisions from your family's perspective.
    - Costs nothing to further evaluate the LegacyTrax Legacy opportunity.
    - Final economic analysis will be based on actual numbers to be determined from informal underwriting process.
    - Decision can be made whether the Legacy Carve-Out makes sense and how much current Legacy Assets should be allocated.

Figure 39

LIVING ASSETS DETAILS

| Year | Living Income | Living Assets |
|---|---|---|
| 1 | $150,000 | $4,381,375 |
| 2 | $153,000 | $4,421,865 |
| 3 | $156,060 | $4,461,008 |
| 4 | $159,181 | $4,498,679 |
| 5 | $162,365 | $4,534,744 |
| 6 | $165,612 | $4,569,063 |
| 7 | $168,924 | $4,601,489 |
| 8 | $172,303 | $4,631,866 |
| 9 | $175,749 | $4,660,029 |
| 10 | $179,264 | $4,685,805 |
| 11 | $182,849 | $4,709,011 |
| 12 | $186,506 | $4,729,454 |
| 13 | $190,236 | $4,746,933 |
| 14 | $194,041 | $4,761,232 |
| 15 | $197,922 | $4,772,127 |

Figure 42

Deficit Results

- Living Assets and Legacy Assets are created over time through various accumulation methods.

- Current deficits can be immediately indemnified with life insurance[1] at your death for the protection of your family. You can provide this protection while accumulating assets by other means throughout the remainder of your career and life.

- Your program can be structured to ensure completion whether you die prematurely, live to life expectancy or beyond, or have funding interruption due to disability or other circumstances.

| FUND | STOP | DISABLED | DIE |
|---|---|---|---|
| Cash Value accrues for living needs[2] | Flexible funding allows for reduced benefit if funding stops | Self-funding features can be triggered by disability to ensure plan completion | Insurance benefit indemnifies desired legacy |

[1] Please consult the life insurance illustration provided for a description of the type of product that may be a possible solution ot your life insurance need.
[2] Withdrawals from life insurance cash values reduce the cash value and death benefit, increase the chances that a policy will lapse and may trigger tax consequences.

Figure 43

┌─────────┬──────────┬─────────┬──────────────────────┬────────────────┐
| Assets | Analysis | Results | Assets Needs Summary | Implementation |
└─────────┴──────────┴─────────┴──────────────────────┴────────────────┘

Living Assets Deficit Summary

| | |
|---|---|
| Net Annual Living Income Needed | $ 150,000 |
| Total Living Assets Needed | $ 4,339,656 |
| Living Assets Available | $ 862,000 |
| Living Assets Deficit | ($3,477,656) |
| Desired Additional Legacy Assets | $ 0 |
| Total Deficit of Living Assets and Legacy Assets | ($3,477,656) |

Figure 44

| Assets | Analysis | Results | Assets Needs Summary | Implementation |

Implementation

- Customization to your specific goals and objectives can create opportunities where the same dollar addresses multiple needs simultaneously. The Multi-Dollar Concept creates tremendous efficiency.

- Consider the following objectives as a springboard for discussion to identify such opportunities.

Personal Needs

- Income Replacement (Living Assets Creation)
- Legacy Creation (Legacy Assets Creation)
- Education Funding/ Protection
- Retirement Funding/ Protection
- Asset Protection

Business Needs

- Business Continuation
- Buy-Sell
- Key Person
- Compensation Planning
- Salary Continuation

     *Instructions for Client Fact Finder Completion*

Dear Producer:

Thank you for the opportunity to review your potential case. This Client Fact Finder is designed to serve two purposes.

First Purpose

First, this is a communication tool between you, as a LegacyTrax™ producer partner, and the LegacyTrax™ team to learn what you already know about this client/prospect. Please do not contact the individual/couple to obtain this information. Initially, we just want to know what you know.

Minimum Information

At a minimum, please provide answers to the following.

- Page 1
  - Producer contact information
  - Client/Spouse Names, Ages, Date of Births (if known)
  - Client/Spouse health info summary (tobacco use, estimated health class, known health issues with details, medications)
- Page 2
  - Qualitative Information from Producer (entire section)
  - Number of children, grandchildren and range of ages
- Page 3
  - Financial Information (as much as you know about each asset and liability class, and income)
  - Life Insurance In Force (how much individual and joint death benefit on client and spouse)

When completed, please scan/email to Tim.Johnson@LegacyTrax.com or fax to 520-885-5580. We will then schedule a phone appointment to review this data together.

Second Purpose

If we decide to move forward, we will discuss and arrive at a case marketing plan together. At our first joint appointment with the client, we will use the Fact Finder to help guide the questions we will ask to gather the additional information we need to formulate our recommendations.

Again, thanks for this opportunity. We look forward to working with you.

The LegacyTrax™ Team

© 2010 Living Legacy Systems, LLC
All Rights Reserved Patent Pending

Figure 46

*4700*

LegacyTraX
LIVING LEGACY SYSTEMS, LLC

*Client Fact Finder*
*Page 1*

Date: _____

Producer: _____ Phone: _____

Email: _____ Cell Phone: _____

Personal Information

|  | Client | Spouse |
|---|---|---|
| Name | _____ | _____ |
| Age / Date of Birth | _____ | _____ |
| Social Security No. | _____ | _____ |
| Address | _____ | _____ |
| City, State, Zip | _____ | _____ |
| Email | _____ | _____ |
| Phone | _____ | _____ |
| Cell Phone | _____ | _____ |
| Employer | _____ | _____ |
| Occupation/Title | _____ | _____ |
| Business Address | _____ | _____ |
| City, State, Zip | _____ | _____ |
| Business Phone | _____ | _____ |
| Business Fax | _____ | _____ |

Tobacco User:   Y     N                  Y     N

If yes, what? _____     If yes, what? _____

Quantity? _____     Quantity? _____

Est Health Class: ☐Pref+ ☐Pref ☐Std ☐Substd _____     ☐Pref+ ☐Pref ☐Std ☐Substd _____

Known Health Issues:  ☐Cancer ☐Heart ☐Stroke         ☐Cancer ☐Heart ☐Stroke
                      ☐Diabetes ☐Blood ☐Liver/Kidney  ☐Diabetes ☐Blood ☐Liver/Kidney Details/Medications: _____     _____

© 2010 LIVING LEGACY SYSTEMS, LLC
All Rights Reserved. Patent Pending

Figure 47

4800

Client Fact Finder
Page 2

Qualitative Information from Producer

Is individual/couple a ☐ Prospect or ☐ Client?

How do you know them? _____

How long have you known them? _____

Do you have ☐ direct access to individual/couple or do you need to ☐ work through an advisor? (Check box.)

If client, what kind of business have you written and how much? _____

How do you feel about sharing case control with a Mentor to "quarterback" fact finding, case development and underwriting?

Children / Grandchildren

How many children combined? _____   Range of ages? _____

How many grandchildren combined? _____   Range of ages? _____

| First and Last Name | Date of Birth | Child or Grandchild | | Child or Grandchild of Client \| Spouse \| Both | | |
|---|---|---|---|---|---|---|
| | | C | G | C | S | B |
| | | C | G | C | S | B |
| | | C | G | C | S | B |
| | | C | G | C | S | B |
| | | C | G | C | S | B |
| | | C | G | C | S | B |

Notes: _____

© 2010 LIVING LEGACY SYSTEMS, LLC
All Rights Reserved. Patent Pending

Figure 48

Client Fact Finder
Page 4

New Life Insurance Needed

| | New Death Benefit | Reason | Has Presentation Been Made? | | Last Meeting Date |
|---|---|---|---|---|---|
| | | | New Death Benefit Need | Premium Financing | |
| Survivorship (Joint Life) | | | Y  N | Y  N | |
| Client (Single Life) | | | Y  N | Y  N | |
| Spouse (Single Life) | | | Y  N | Y  N | |

Reason: E=Estate Liquidity | K=Key Person | S$=Split Dollar | SERP | I=Income Replacement Has a presentation been made to advisor(s)?  Y  N    If yes, what? ☐ Death Benefit ☐ Premium Financing When? _____ To whom? _____

Estate Planning Objectives

On a scale from 1 to 10 (10 being very concerned), how concerned are you about the following?

Retirement Income Planning _____ Why _____
Income Tax Planning _____ Why _____
Income for Surviving Spouse _____ Why _____
Transferring Wealth to Heirs _____ Why _____
Paying Gift Taxes _____ Why _____
Paying Estate Taxes _____ Why _____
Forced Liquidation of Real Estate _____ Why _____
Forced Liquidation of Business _____ Why _____
Benefiting Charities _____ Why _____

To further qualify the above, please answer the following:

On a scale of 1 to 10 (10 is highest), what is your aversion level to paying estate taxes? _____

How much do you want each heir to receive as a financial legacy (in today's dollars)? _____

Are there any special considerations regarding certain heirs that would impact your decision to transfer a financial legacy to them? (For example, second marriages, spendthrift issues, alcohol/drug problems, spousal issues with your children, heirs with disabilities.) _____

Please describe your current charitable interests, if any. _____

© 2010 LIVING LEGACY SYSTEMS, LLC
All Rights Reserved. Patent Pending

Figure 50

Client Fact Finder
Page 5

Estate Planning (Continued)

If married, does each spouse plan to pass all assets to the other spouse at death? Y  N    If no, please describe?

_____

_____

How much of your lifetime exemption is remaining? _____
Please identify which planning techniques you are familiar with and have utilized.

| | Familiar With | Have Utilized | Date Utilized |
|---|---|---|---|
| Irrevocable Life Insurance Trust (ILIT) | | | |
| Intentionally Defective Grantor Trust | | | |
| Family Limited Partnerships (FLP) | | | |
| Grantor Annuity Trusts (GRATs) | | | |
| Installment Sales | | | |
| Qualified Personal Residence Trusts (QPRTs) | | | |
| Qualified Terminal Interest Property (Q-TIP) | | | |
| Private Financing | | | |
| Systematic Gifting Programs | | | |
| Charitable Remainder Trust | | | |

Advisor Team

| | Name | Email | Phone | Last Contact |
|---|---|---|---|---|
| Attorney | | | | |
| Accountant | | | | |
| Stock Broker | | | | |
| Banker | | | | |
| Insurance Agent | | | | |

Notes: _____

© 2010 LIVING LEGACY SYSTEMS, LLC
All Rights Reserved. Patent Pending

Figure 51

"Family Vault" – Execution Phase ⟵ 5400

- IDGT (Intentionally Defective Grantor Trust
- Installment Sales
- GRATs (Grantor Retained Annuity Trusts)
- Asset Protection Trust
- Dynasty Trust
- Commercial Financing
- Private Financing
- Re-Capitalization Strategies
- Restricted Split Dollar
- Private Split Dollar How it works

Leveraged "Family Vault"

ASSET INVESTMENT TOOL

CROSS-REFERENCE TO RELATED APPLICATIONS

This Application is a Continuation-In-Part of Non-Provisional Patent Application having Ser. No. 13/008,753, and filed Jan. 18, 2011. This application further claims priority from a U.S. Provisional Application having Ser. No. 61/511,947, filed Jul. 26, 2011. The contents of each of these references are incorporated by reference herein in their entirety, for all purposes.

BACKGROUND

Asset holders commonly find it difficult to determine an investment strategy that protects their lifetime income needs and improves a post-mortem asset disbursement to their beneficiaries. Agents or brokers may guide such asset holder through various estate planning options, such as wills and trusts, each having complex tax ramification; however, the optimum strategy may not be readily calculated or easily communicated to the asset holder.

Moreover, these agents or brokers may be a part of a larger financial advisory team that ultimately crafts the asset holder's investment strategy. The financial advisory team may include supervisors, lawyers, or accountants, each having a different relationship with the asset holder. For example, advice from a lawyer representing the asset holder may be subject to an attorney-client privilege while recommendations from the broker of the asset holder may not be. Yet, the financial advisory team members often must interact with one another in order to determine the optimum investment strategy for the asset holder.

Accordingly, it would be an advance in the art to provide a case management tool that allows a financial team to determine strategic approaches for investing an asset holder's assets in order to satisfy the asset holder's lifetime income needs and improve the asset holder's post-mortem asset disbursement.

FIELD

The present invention generally relates to asset investment and more particularly to asset investment for effective post-mortem asset distribution.

COPYRIGHT

Contained herein are materials subject to copyright protection. The copyright owner has no objection to the facsimile reproduction of the patent disclosure by any person as it appears in the Patent and Trademark Office patent files or records, but otherwise reserves all rights to the copyright whatsoever.

SUMMARY

In one implementation, a case management tool receives from a vendor computing device, information about an asset of an asset holder. As a general matter, references herein to an "asset" refer to either a financial asset, a tangible asset, or an intangible asset. As those skilled in the art will appreciate, a financial derives value arising from a contractual agreement. Stocks, bonds, bank deposits, insurance policies, accounts receivable, and the like are all examples of financial assets.

In certain embodiments, Applicant's case management tool identifies and inputs separately liquid assets and non-liquid assets. In certain graphical displays, Applicant's case management tool 106 displays liquid assets using a green-colored font and non-liquid assets using a red-colored font. In certain embodiments, Applicant's case management tool 106 utilizes the input values for liquid assets and non-liquid assets differently in an asset surplus analysis as opposed to an asset deficit analysis. In certain embodiments one or more inputs are variable and in other embodiments one or more inputs are preselected at a set amounts.

Tangible assets contain various subclasses, including current assets and fixed assets: Current assets include inventory, while fixed assets include such items as buildings and equipment. Intangible assets are nonphysical resources and rights that have a value because they give some kind of advantage in the market place. Examples of intangible assets are goodwill, copyrights, trademarks, patents and computer programs.

An expected expenditure of the asset holder over the life expectancy period is determined. In certain embodiments, Applicant's algorithm comprises a life expectancy calculator. In certain embodiments, the life expectancy calculator is based upon a single life. In certain embodiments, the life expectancy calculator is based upon a joint life. In certain embodiments, the life expectancy calculator is based upon both a single life and a joint lift.

A "carve out" from the asset that is to be invested during the life expectancy period is also determined. In certain embodiments, this carve out takes into account both gift tax and estate tax exclusions. In certain embodiments, the carve out is calculated and displayed as originating from Tax and Legacy assets in certain specified proportions. In certain embodiments, Applicant's case management tool 106 comprises computer readable program code to calculate and display a Maturity Value of specified amount of funds. In certain embodiments, Applicant's case management tool 106 comprises computer readable program code to calculate and display a carve-out value required to generate After-Tax Carve-Out Income that would produce the calculated Maturity Value.

In certain embodiments, Applicant's case management tool 106 further includes a Charitable Feature. In certain embodiments, this Charitable Feature includes a Zero Estate Tax Option.

In certain embodiments, the carve-out is increased by a percentage of Outright Gift Discount Transfer. Here, the carve-out amount is divided by a function of the Estate Tax rate. For example, the carve-out amount is divided by (100%-XX%) in which the XX% is the Estate Tax Rate.

A post-mortem tax value that will be imposed on the portion of the assets left after the expected expenditure is spent for both with and without investment of the carve out funds. Both post-mortem tax values are sent to the vendor computing device. In certain implementations, a return on investment of the carve out funds that is to be distributed to a beneficiary is also determined and sent to the vendor computing device.

In certain implementations, information about one or more assets owned by an asset holder is received. A expected aggregate expenditure of the asset holder over the life expectancy period is set. A first investment corpus, which is the difference between the aggregate value for the one or more assets and the aggregate expenditure, and the value of the first investment corpus life expectancy is calculated. A first estimated post-mortem tax liability imposed on the first investment corpus life expectancy value is calculated. A value for carve out funds deducted from the investment corpus is set. A second investment corpus, which is the difference between said first investment corpus and said carve out funds, is calculated. A second investment corpus life expectancy value is calculated. A second estimated post-mortem tax liability imposed on the second investment corpus life expectancy value is calculated. A value for life insurance proceeds paid at end of life expectancy is determined, in which the life insurance proceeds are realized from a life insurance policy covering the asset holder and purchased using the carve out funds.

In certain implementations, a system for determining a strategy for post-mortem asset disbursement includes: a vendor computing device, a mentor computing device, and a case management computing device. The case management computing device receives information about an asset of an asset holder from the vendor computing device. The case management device determines an expected expenditure of the asset holder over a life expectancy period and a first post mortem tax value that will be imposed on a portion of the asset left after expenditure of the expected expenditure is spent. The case management device determines a value for a carve out that is to be invested during the life expectancy period and determines a second post-mortem tax value that will be imposed on a portion of the assets less the expected expenditure and carve out. The case management computing device sends to the mentor computing device both the first and second post-mortem tax values. The mentor computing device sends an approval to the case management computing device, which, sends the first and second post-mortem tax values to the vendor computing device.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

This invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
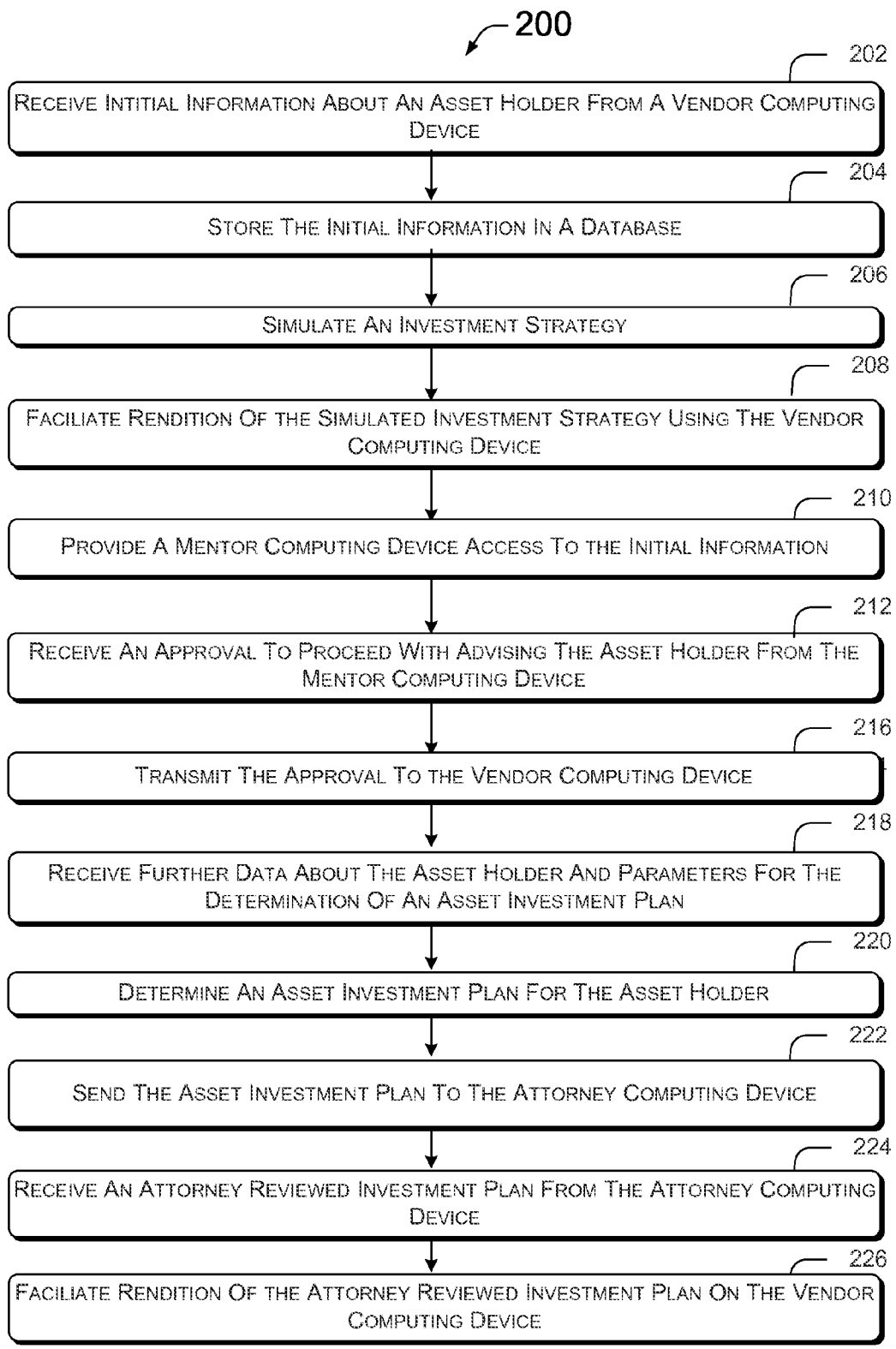
FIG. 2 illustrates a flow chart of an exemplary method developing an investment strategy for an asset holder through collaboration between members of a financial advisory team.
Figure 4:
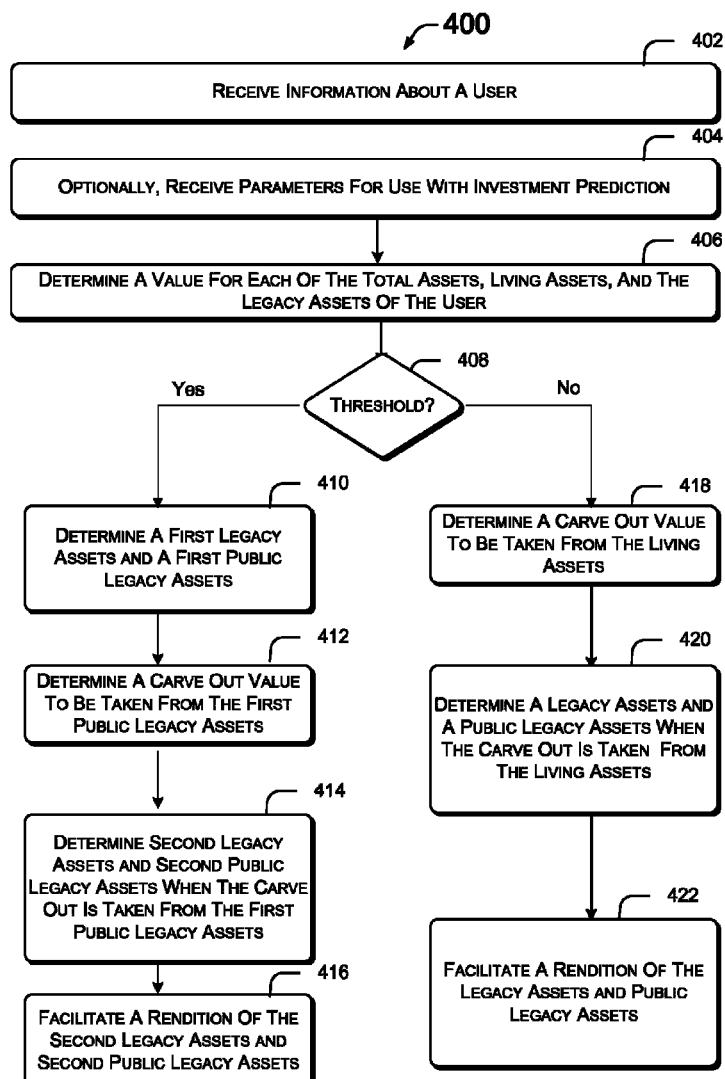
FIG. 4 illustrates a flow chart of an exemplary method for asset investment.

The schematic flow chart diagram included are generally set forth as logical flow-chart diagrams (e.g., FIGS. 2 and 4). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 2 and 4). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Members of a financial advisory team have similar or diverse levels of access to a case management computing device ("case management tool") that facilitates determination of a financial investment strategy, such as a post-mortem asset disbursement, for assets of an individual, a group of individuals, or an entity (collectively "asset holder"). The members of the financial advisory team may include: a vendor, a mentor, a manager, an accountant, a lawyer, or combinations thereof, for example. The members may have different roles in determining the investment strategy for the asset holder. For example, a vendor may be a broker or agent that sells various financial plans to an asset holder.

A mentor may be a more senior broker or agent that works with the vendor or vendors to facilitate optimizing the investment plan or the mentor may control the quality of financial advice given to the asset holder(s). In one implementation, a manager may be a person that is responsible for an efficient workflow between the vendors and mentors, for example. In another implementation, the manager is a liaison between an entity hosting Applicant's case management tool and the vendor or mentor. A single mentor or manager may have a single or a plurality of vendors working under its guidance.

In certain embodiments, Applicant's case management tool 106 comprises computer readable program code to input data for, and display values for, a Supervising Manager. In certain embodiments, Applicant's case management tool 106 comprises computer readable program code to sort of the Supervising Manager field. In certain embodiments, In certain embodiments, Applicant's case management tool 106 comprises computer readable program code to sort of a Supervising Manager field as a first level, second level, or third level, search query.

References herein to "members" and references herein to "advisors" refer to a synonymous group individuals. In certain embodiments, Applicant's case management tool 106 comprises computer readable program code to limit the ability of a Mentor or a Manager to changes the listing of Advisors/Members listed as reporting to them.

The members may use the case management tool to retrieve, categorize, evaluate, or report on data about the assets of the asset holder. For example, one member may access the case management tool to enter data about the assets of the asset holder while another member may access the case management tool to simulate investment of a portion of the assets in order to maximize a non-taxable transfer of the assets to a beneficiary of the asset holder.

In one implementation, the case management tool is used to determine an individual's financial investment strategy in order to maximize distribution of an individual's assets to the individual's heirs. The members use the case management tool to categorize the assets of the individual into a projected Living Assets and a Legacy Assets.

In certain embodiments, Applicant's case management tool 106 identifies and inputs separately liquid assets and non-liquid assets. In certain graphical displays, Applicant's case management tool 106 displays liquid assets using a green-colored font and non-liquid assets using a red-colored font. In certain embodiments, Applicant's case management tool 106 utilizes the input values for liquid assets and non-liquid assets differently in an asset surplus analysis as opposed to an asset deficit analysis.

The Living Assets includes a value of the assets that the individual is likely to expend ("expected aggregate expenditure") within a predefined window of time, such as a life expectancy period. In certain embodiments, Applicant's case management tool 106 comprises computer readable program code to display an input field denominated Net Annual Living Income Needs. In certain embodiments, Applicant's case management tool 106 comprises computer readable program code to display an input field denominated Number of Years to Life Expectancy. In certain embodiments, Applicant's case management tool 106 comprises computer readable program code to calculate and display delayed withdraw of Living Income from the Living Assets for a specified number of years.

The Legacy Assets ("investment corpus") includes a value of the assets that the individual is likely not to expend within the predefined window of time. In certain embodiments, Applicant's case management tool 106 comprises computer readable program code to calculate and display continued growth in Legacy Assets for a specified number of years. Here, members of the financial advisory team for the individual may access the case management tool to facilitate creation of an investment plan that will maintain the individual's Living Assets while maximizing a portion of the Legacy Assets that will be distributed to the heirs of the individual. For example, the member may use the case management tool to carve out a portion of the projected Living Assets, the Legacy Assets, or a combination thereof, to simulate investment into a life insurance policy that transfers the proceeds to the heirs after the death of the individual. In one implementation, if the Legacy Assets of the asset holder is above a predetermined threshold (e.g., $0.00 or $1,000,000), then the carve out funds are taken from the portion of the Legacy Assets (between 0% to 100% of the Legacy Assets), such as a portion that would have been paid as an estate tax to a government agency.

Figure 1:
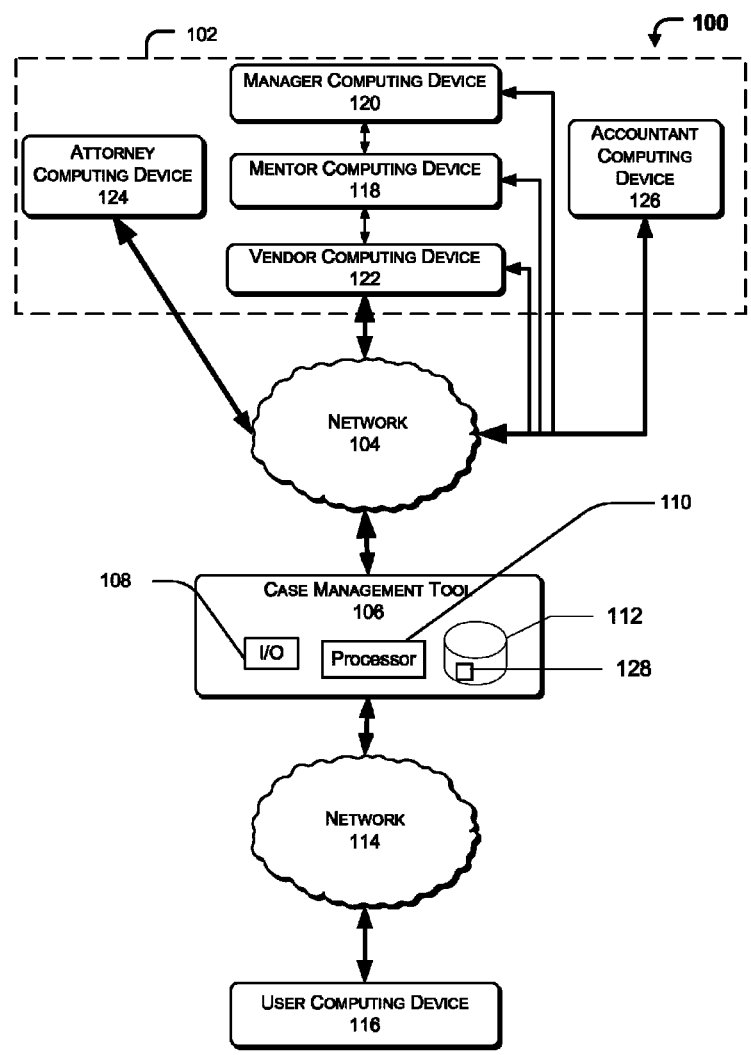
FIG. 1 is a block level diagram illustrating an exemplary system for asset investment.

Referring to FIG. 1, a block diagram illustrates a system 100 for asset investment. The system 100 depicts a case management tool 106 that is communicatively connected to a member computing device 102 through a first network 104 (e.g., a private network or public network such as the Internet) and a user computing device 116 through a second network 114 (e.g., a user network, which can be a public network such as the Internet). The member computing device 102 is a computing device operated by a member of one or more financial advisory teams. For example, the member computing device 102 may be an attorney computing device 124, a mentor computing device 118, a manager computing device 120, a vendor computing device 122, an accountant computing device 126, or a combination thereof, each operated by an attorney, a mentor, a manager, a vendor, or an accountant, respectively. Other member computing devices 102 of other member types (e.g., an insurer computing device of an insurer) are also applicable. The user computing device 116 may be operated by a user, such as the asset holder.

Although one member computing device 102 and one user computing device 116 are shown in FIG. 1, it will be apparent to those of ordinary skill in the art that any number of entities and corresponding devices can be part of the system 100. For example, only a single user computing device 116 may be communicatively connected to Applicant's case management tool 106 while no member computing device 102 is communicatively connected to Applicant's case management tool 106, or visa versa. Alternatively, 500 member computing devices 102 and 3 user computing devices 116 may each be communicatively connected to Applicant's case management tool 106. Further, while two networks 104 and 114 are shown, any number of networks could also be provided in the system 100, or the networks 104 and 114 may be a single network.

The member computing device 102, Applicant's case management tool 106, and the user computing device 116 may each be a computing device (e.g., a special purpose computer) such as a server, a mainframe computer, a mobile telephone, a personal digital assistant, a personal computer, a laptop, an email enabled device, or a web enabled device having one or more processors (e.g., a Central Processing Unit, a Graphical Processing Unit, or a microprocessor) that executes Applicant's computer readable program code 128 to receive data, transmit data, generate data, store data, or performing methods. When Applicant's computer readable program code 128 is executed, that executed code may generate Applicant's case management tool 106 and visually display, on an interconnected visual display device, a series of graphical user interfaces, wherein each graphical user interface comprises one or more interactable graphical objects. Activation any one of such interactable graphical objects using, for example and without limitation, a computer mouse, a pointing device, and the like, causes Applicant's computer readable program code to, for example and without limitation, transition to a new graphical user interface, and/or display a "drop down" menu, and/or executes a different portion of Applicant's computer readable program code.

Each computing device may further include input/output capabilities (e.g., a keyboard, a mouse, a stylus and touch screen, or a printer), or one or more data repositories storing data that may or may not be encrypted. The computing devices 102, 106, or 116 may include wired or wireless communication devices which can employ various communication protocols including near field (e.g., "Blue Tooth") or far field communication capabilities (e.g., satellite communication or communication to cell sites of a cellular network) that support any number of services such as: Short Message Service (SMS) for text messaging, Multimedia Messaging Service (MMS) for transfer of photographs and videos, or electronic mail (email) access.

In certain implementations, a computing device, such as device 106, includes instructions or executable code, such as computer readable program code 128, residing in a non-transitory computer readable medium, such as computer readable medium 112, where that computer readable program code is executable by a processor, such as processor 110, to perform one or more of steps recited in FIG. 2 or 4 or other processes or methods described herein. In other implementations, the instructions may reside in any other computer program product, where those instructions are executed by a computer external to, or internal to the data repository to perform one or more of steps in FIG. 2 or 4, for example. In either case, the instructions may be encoded in computer readable medium comprising in the data repository that may be, for example, a magnetic information storage medium, an optical information storage medium, an electronic information storage medium, and the like.

The data repository may be one or more hard disk drives; tape cartridge libraries; optical disks; or any suitable volatile or nonvolatile storage medium, storing any combination of databases, or the components thereof, in a single location or in multiple locations, or as an array such as a Direct Access Storage Device (DASD), redundant array of independent disks (RAID), virtualization device, . . . etc. Examples of a data repository include, without limitation, one or more devices, such as, a Programmable Read-Only Memory (PROM), Flash PROM, Erasable Programmable Read-Only Memory (EPROM), Electrically Erasable Programmable Read-Only Memory (EEPROM), compactflash, smartmedia, and the like. The data repository may include a database that is structured by a database model, such as a relational model or a hierarchical model.

The networks 104, 114, or other networks described in this application, may be public or private networks, and may include any of a variety of one or more suitable means for exchanging data, such as: the Internet, an intranet, an extranet, a storage area network (SAN), a wide area network (WAN), a local area network (LAN), a virtual private network, a satellite communications network, an Automatic Teller Machine (ATM) network, an interactive television network, or any combination of the foregoing. The networks may contain either or both wired or wireless connections for the transmission of signals including electrical connections, magnetic connections, or a combination thereof. Examples of these types of connections are known in the art and include: radio frequency connections, optical connections, telephone links, a Digital Subscriber Line, or a cable link. Moreover, networks may utilize any of a variety of communication protocols, such as Transmission Control Protocol/Internet Protocol (TCP/IP), for example.

In the illustrated embodiment of FIG. 1, computing device 106 comprises a processor 110, an input/output means 108, and a computer readable medium 112, i.e. data repository 112, and computer readable program code 128 encoded in computer readable medium 112. The processor 110 executes the executable code 128 to electronically communicate with the member computing device 102 or the user computing device 116. The data stored in the data repository 112 of Applicant's case management tool 106 may include profile or demographic information about the asset holder, such as a name of the asset holder, an age of the asset holder, a description of the health of the asset holder, or a value for each of the assets (e.g., currency, stocks, bonds, real estate, business holding, annuities or other forms of assets) of the asset holder. The data stored in the data repository 112 may have been received from the user computing device 116 or the member computing device 102, for example.

Each of the members of the financial advisory team may have a different level of access or privilege rights to Applicant's case management tool 106. For example, an attorney representing the asset holder may have greater access to data stored in the data repository 112 including data describing the legal liabilities of the asset holder. Similarly, the accountant, which is part of the financial advisory team of the asset holder, may be denied access to the data describing the liabilities of the asset holder but have access to a portion of Applicant's case management tool 106 to audit the asset holder's prior investment portfolio. In yet another example, the manager may manage more than one financial advisory team, each for a different asset holder. Here, the manager may have exclusive access to that portion of Applicant's case management tool 106 that aggregates data across the more than one financial advisory teams. For example, the manager may be able to evaluate and create reports on the premiums collected across the more than one financial advisory teams, the success rates of vendors selling investment programs across geographic localities, the timeliness of vendors in following up with their respective asset holders, or other parameters that may be of interest to the manager.

Referring to FIG. 2, a flow chart illustrates an exemplary method 200 for developing an investment strategy for an asset holder through collaboration between members of a financial advisory team. At a step 202, Applicant's case management tool 106 receives initial information about an asset holder from a vendor computing device 122. For example, Applicant's case management tool 106 may receive a name, an age, a value for the total assets of the asset holder, and a description of the health of the asset holder (e.g., tobacco smoker). At a step 204, Applicant's computer readable program code, via Applicant's case management tool 106, stores the received initial information in the data repository 112. At a step 206, Applicant's case management tool 106 simulates an investment strategy for the asset holder. For example, the case management tool 106 may determine that a portion of the total assets of the asset holder can be invested in a life insurance policy having a tax-exempt maturity value of $1,000,000 thereby decreasing an estimated post-mortem tax liability. At the step 208, Applicant's computer readable program code 128 facilitates the rendition of the simulated investment strategy using the vendor computing device 122. For example, Applicant's case management tool 106 may send the vendor computing device 122 an electronic file that can be rendered upon a monitor connected to the vendor computing device 122. Alternatively, or in combination, the vendor computing device 122 may create a hard copy of the electronic file printing the electronic file on paper using a printer connected to the vendor computing device 122.

At a step 210, Applicant's case management tool 106 provides a mentor computing device 118 access to the initial information, the simulated investment strategy, both, or other information. For example, the case management tool 106 may form a message that includes an estimated post-mortem tax liability if the life insurance policy is purchased and an estimated post-mortem tax liability if the life insurance policy is not purchased. Here, the mentor uses the mentor computing device to evaluate the initial information or the simulated investment strategy; provide comments or alternative approaches; or indicate an approval to continue advising the asset holder that is then communicated to the vendor computing device 122. At a step 212, Applicant's case management tool 106 receives from the mentor computing device 118, an approval to proceed with advising the asset holder. The approval is transmitted to the vendor computing device at a step 216. In certain embodiments, Applicant's case management tool 106 comprises computer readable program code to select or de-select a requirement that a mentor review and approve new reports generated by a member. In certain embodiments, Applicant's case management tool 106 comprises computer readable program code to select or de-select a requirement that a mentor review and approve new reports generated by an Advisor.

At a step 218, Applicant's case management tool 106 receives further data about the asset holder and parameters for the determination of an asset investment plan. For example, the vendor may obtain more detailed information about the assets of the asset holder, such as the break-down of the assets in categories of: stocks, bonds, cash, or real estate. The vendor may enter the data into the vendor computing device 122 along with parameters such as an inflation rate, a state or federal tax percentage, an estimated estate tax percentage, or an estimated rate of return for one or more asset categories. At a step 220, Applicant's case management tool 106 uses the data and parameters received in the step 218 or other information stored in the data repository 112 to determine an asset investment plan for the asset holder.

At a step 222, Applicant's case management tool 106 transmits the asset investment plan to the attorney computing device 124. For example, the Applicant's case management tool 106 may form a message that includes the carve out funds for delivery to the attorney computing device 124. Here, the attorney may use the attorney computing device 124 to review the details of the asset investment plan, the information stored in the data repository 112, such as confidential data about the asset holder (e.g., offshore accounts, alimony obligations, child support obligations), or data protected under attorney-client privileged, or other information received in confidence from the asset holder, to determine legal consequences for the proposed investment plan. The attorney may leave the asset investment plan unchanged, or alternatively, the attorney may change the asset investment plan, such as proposing an alternate carve out 314 value. At a step 224, Applicant's case management tool 106 receives the attorney reviewed investment plan from the attorney computing device 124. At a step 226, Applicant's case management tool 106 facilitates the rendition of the attorney reviewed investment plan using the vendor computing device 122. For example, the case management tool 106 may form a transmission for delivery to the vendor computing device including both the first post-mortem tax value and the second post-mortem tax value that are each, in turn, rendered on a display coupled to the vendor computing device.

The method of 200 may be implemented in real-time, in batch mode, or with time delays between steps that may occur in the order shown, in another order, with added steps, or with deleted steps. For example, the steps 202 through 226 may all occur in one session while the asset holder is sitting with the vendor in the vendor's office. In another implementation, the steps 202 through 208 may occur in a first session with the asset holder on a first day. The steps 210 through 216 may occur in a subsequent, second day and the steps 218 through 226 may occur in a second session with the asset holder, a week from the second day.

In one implementation, Applicant's case management tool 106 categorizes the assets of the asset holder into two or more categories and determines the investment plan for each category. In one implementation, the assets of the asset holder may be segregated into two categories ("dual asset investment strategy"): a Living Assets 302 category and a Legacy Assets 304 category. Living Assets 302 includes a value of the assets that the asset holder is likely to expend within the predefined window of time, such as from a present time to the end of predicted life expectancy period. This value may be determined through consultation with the asset holder. The Legacy Assets 304 includes a value of the assets that the asset holder is likely not to expend within the predefined window of time, such as from the present time to the end of predicted life expectancy period ("investment corpus life expectancy value").

Figure 3A:
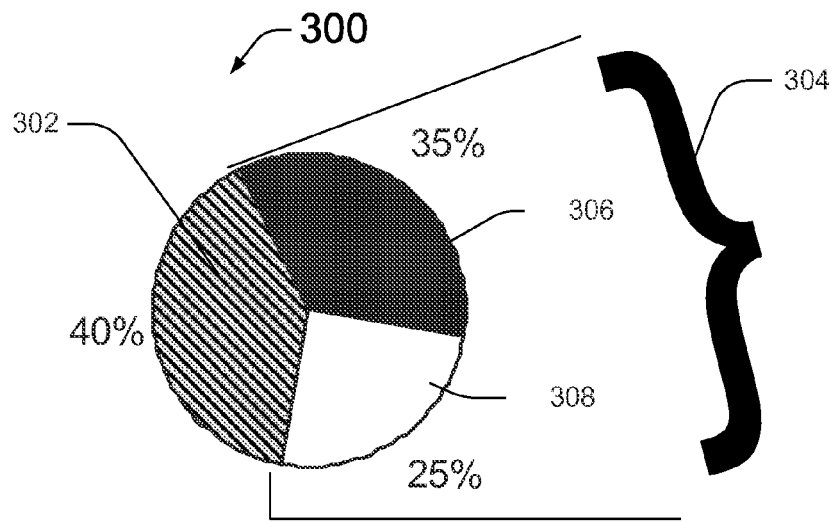
FIGS. 3a and 3b each include a pie chart illustrating a distribution of assets of an asset holder.

Referring to FIG. 3a, a pie chart 300 illustrates an exemplary distribution of the value of assets of an asset holder into a Living Assets 302 category and a Legacy Assets 304 category. The distribution is calculated for a point in time, such as at the end of a predicted life expectancy period (e.g., 20 years from the present). Here, the Legacy Assets 304, is further categorized into sub-categories: Private Legacy Assets 306 and Public Legacy Assets 308 (e.g., post-mortem tax liability). In certain embodiments, Applicant's case management tool 106 comprises computer readable program code to calculate and display projected Private Legacy Assets and Public Legacy Assets at a specified growth rate over a specified number of years and at Life Expectancy.

The Legacy Assets 304 is distributed, after the passage of the predefined window of time, to the beneficiary of the asset holder (Private Legacy Assets 306) and to the public (Public Legacy Assets 308) through taxation. For example, the Private Legacy Assets 306 can be the portion of the total assets of the asset holder that is likely to survive the asset holder after his death that is then transferred to his heirs. Similarly, the Public Legacy Assets 308 is the portion of the total assets of the asset holder that is likely to survive the asset holder after his death, which is then transferred to society, such as through an estate tax.

In pie chart 300 of FIG. 3a, the Living Assets 302 is illustrated as 40% of the value of the total assets of the asset holder and the Legacy Assets 304 is illustrated as 60% of the value of the total assets. Here, the Private Legacy Assets 306 is illustrated as 35% of the value of the total assets and the Public Legacy Assets 308 is illustrated as 25% of the value of the total assets.

Figure 3B:
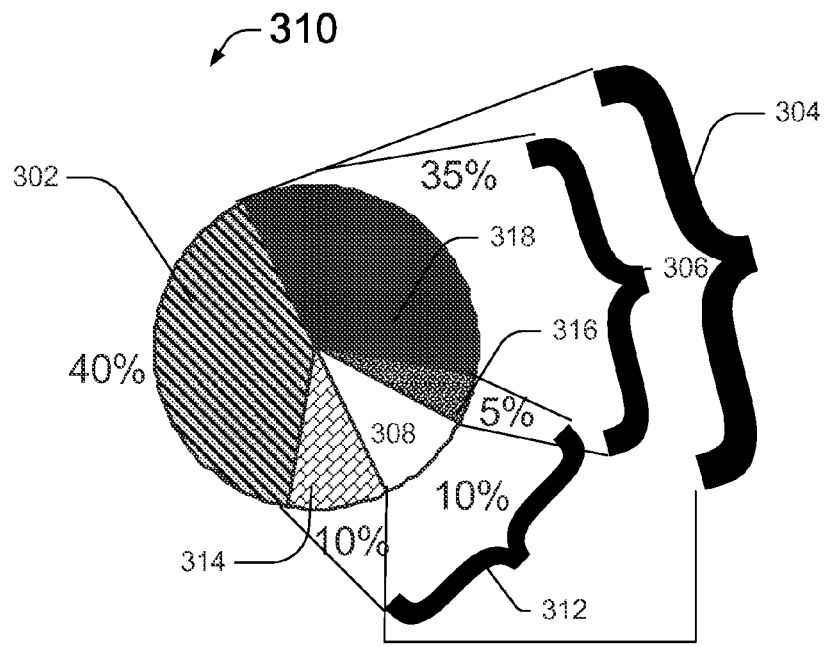

Referring to FIG. 3b, a pie chart 310 illustrates another exemplary distribution of the value of the total assets, where the Private Legacy Assets 306 has increased due to investment of a carve out 314. As with pie chart 300, the pie chart 310 illustrates the Living Assets 302 as 40% of the value of the total assets of the asset holder. However, the Legacy Assets 304 is illustrated as 50% (=35%+5%+10%) of the value of the total assets and the remaining 10% is illustrated as the carve out 314 that is simulated to be invested during the predefined window of time (e.g., life expectancy period).

As a result of the investment of the carve out 314, the distribution between the Private Legacy Assets 306 and the Public Legacy Assets 308 is changed in the pie chart 310 as compared to the pie chart 300. Referring to pie chart 310, the Private Legacy Assets 306 is shown to have increased from 35% (pie chart 300) to 40% (=35%+5% in pie chart 310) of the value of the total assets due to the simulated investment of the carve out 314. Similarly, the Public Legacy Assets 308 is shown to have decreased from 25% (pie chart 300) to 10% of the value of the total assets (pie chart 310) because of the simulated investment of the carve out 314. The simulated investment of the carve out 314 may be an investment into a life insurance policy through payment of premiums of the life insurance policy during the life span of the asset holder that is paid out at the end of the life of the asset holder.

In pie chart 310, the carve out 314 is illustrated as being taken out of the Public Legacy Assets 308 portion of the of pie chart 300 (shown in pie chart 310 as portion 312). Here, 10% of the value of the total assets that would have gone to estate taxes in FIG. 3a is, instead, invested in a life insurance policy (shown as carve out 314) such that it is no longer part of the Public Legacy Assets 308 in FIG. 3b. At the end of the predefined window of time, the value of the life insurance policy becomes part of the Private Legacy Assets 306. The Private Legacy Assets 306 of FIG. 3a (shown in FIG. 3b as portion 318) is increased by 5% of the total assets (shown as portion 316). Therefore, even though the asset holder does not change his Living Income needs (the Living Assets 302 stays at 40% of the total assets in both pie chart 300 and 310), the asset holder can increase his Private Legacy Assets 306 by investing a carve out 314 portion of what would have transferred to society into an investment program that transfers value into the Private Legacy Assets 306 (e.g., life insurance policy).

In one implementation, the investment program may result in a value of assets ("investment program assets") that is, itself, tax exempt. In another implementation, the investment program may result in the investment program assets that are not tax exempt, such as when the proceeds of the life insurance are included in the legal "estate" of the asset holder that is then subject to federal, state, or inheritance tax. When the investment program assets are not tax exempt, the investment program assets are distributed to both the Private Legacy Assets 306 and the public Legacy Assets 308.

As described hereinabove, Applicant's case management tool 106 can be used to determine the value of the assets of the asset holder. The case management tool 106 may also be used to optimize the distribution of the assets among the Living Assets 302 and Legacy Assets 304 and among the Private Legacy Assets 306 and the Public Legacy Assets 308. The algorithm may be executed by a processor in a computing device within the system 100.

Referring to FIG. 4, a flow chart illustrates an exemplary method 400 for dual asset investment strategy that can be implemented using Applicant's case management tool 106 in real time, non-real time, or batch mode. For example, the steps of the method 400 may be executed consecutively in real time. Alternatively, the steps may be executed in a different order over a duration of time that includes a delay between the steps.

At a step 402, Applicant's case management tool 106 receives information about the asset holder. The information may include data about the assets of the asset holder and data that is sufficient to determine a life expectancy of the asset holder. For example, Applicant's case management tool 106 may receive an electronic transmission from the member computing device 102 that includes an asset holder's name; an asset holder's age; a description of the asset holder's health (e.g., whether the asset holder smokes or has cancer); a description of expenses and liabilities of the asset holder (e.g., a rent, a mortgage, a loan . . . etc.); and a description of the current assets of the asset holder, such as a value for each of the asset holder's: currency, stocks, bonds, real estate, or other forms of assets.

Applicant's case management tool 106 may store the received data in the data repository 112. The data in the data repository 112 can then be accessed to retrieve data previously entered, for example. To illustrate, after the member uses the member computing device 102 to transfer information about the asset holder to Applicant's case management tool 106 at the step 402, the member may wish to create a report rending the current value of the assets on paper. Here, the member computing device 102 may send a transmission to Applicant's case management tool 106 requesting a report. Applicant's case management tool 106 may access the data repository 112 to retrieve and conduct analysis on the information about the asset holder, or other data derived from the information, to create the report. Applicant's case management tool 106 may send the member computing device 102 an electronic report created from the retrieved data via the network 104. The member computing device 102 may, in turn, print the report on paper. In another implementation, the member may enter part of the information about the asset holder at the step 402, terminate the communication with Applicant's case management tool 106 with regard to the asset holder, and return at a different time or day to complete, update, or augment the transmission of information about the asset holder.

At a step 404, Applicant's case management tool 106 may optionally receive parameters for use with investment analysis. For example, the member computing device 102 may send an electronic transmission to Applicant's case management tool 106 including current inflation rates, current return rates for identified stock owned by the asset holder, predicted future tax rates, or other parameters that are sufficient to determine a future value of the assets of the asset holder.

In another implementation, the data repository 112 may store the values for the parameters. For example, a first member computing device 102 may send the parameters to Applicant's case management tool 106 for a first asset holder. Applicant's case management tool 106 may store the parameters in the data repository 112. Thereafter, a second member computing device 102 or a second user computing device 116 may access Applicant's case management tool 106 to determine an investment strategy for a second asset holder. Applicant's case management tool 106 may access the data repository 112 to retrieve the parameters entered for the first asset holder to determine the investment strategy for the second asset holder without receiving the parameters from the second member computing device 102 or the second user computing device 116. In yet another implementation, the parameters may automatically be retrieved from another database, such as a database linked to a server associated with a stock exchange, such as the New York Stock Exchange, or a database associated with a publicly accessible website via network 114.

At a step 406, Applicant's case management tool 106 determines the value of the total assets, the Living Assets 302, and the Legacy Assets 304 of the asset holder. The total assets may have a present value that can be extrapolated to a future value as a function of time, inflation rate, and other factors, as is known in the art. Here, the value of the total assets and the Living Assets 302 is extrapolated for a predefined window of time. The predefined window of time may be arbitrary, such as arbitrarily selecting "10 years" as the predefined window of time. Alternatively, the predefined window of time may be based, at least in part, on the information received at the step 402.

In one implementation, the predefined window of time may be a period from a present time to the end of a predicted life expectancy period of the asset holder (e.g., 30 years for a 50-year old woman). For example, the predicted life expectancy period of the asset holder may be determined through use of information received about the demographic and/or health of the asset holder from the step 402 and/or a mortality table that is statistically calculated by actuaries, as is known in the art. Alternatively, the predicted life expectancy period of the asset holder may be data received in the information about the asset holder at the step 402. Other means for determining the life expectancy are also contemplated.

In one implementation, Applicant's case management tool 106 extrapolates or estimates a value of the total assets, the Living Assets 302, and the Legacy Assets 304 at the end of the life expectancy period using the information about the asset holder from the step 402 and the parameters for use with investment prediction. To illustrate, the value of the total assets may be extrapolated based, in part, on an assumed rate of return for the stock of the asset holder, identified in the step 402. Other means for extrapolation or estimation of a value for the assets of the asset holder are also contemplated, as is known in the art. Similarly, Applicant's case management tool 106 can determine the Living Assets 302 of the asset holder based on the information about the asset holder received in the step 402. For example, Applicant's case management tool 106 may utilize the information about the expenses and liabilities of the asset holder received in the step 402 to determine the value of the assets that the asset holder is likely to expend during the predefined window of time. To illustrate, if the life expectancy of the asset holder is 20 years, the value of the expenses and liabilities of the asset holder may be extrapolated for the duration of the 20 years to determine how much of the total assets the asset holder is likely to expend in the 20 years.

Applicant's case management tool 106, in turn, determines the Legacy Assets 304 as a function of the total assets and the Living Assets 302. For example, Applicant's case management tool 106 may calculate the value of the Legacy Assets 304 to equal the value of the total assets minus the value of the Living Assets 302.

At a step 408, Applicant's case management tool 106 determines if the Legacy Assets 304 of the asset holder exceeds a predetermined threshold. The threshold may be a minimum threshold (e.g., at least zero or at least $US10,000) or a maximum threshold (e.g., at most zero or-$US100,000). In one implementation, the threshold can define when the asset holder has a surplus or a deficit in Legacy Assets 304. For example, when the Legacy Assets 304 is above a zero threshold, then there is a surplus of the Legacy Assets 304 that can be invested for optimum distribution between the Private Legacy Assets 306 and the Public Legacy Assets 308. Alternatively, when the Legacy Assets 304 is below the zero threshold, then there is a deficit of the Legacy Assets 304. This may occur, for example, when the Living Assets 302 of the asset holder is insufficient to supply income to the asset holder during the lifetime of the asset holder. Here, the Living Assets 302 of the asset holder can be invested for optimum distribution between the Living Assets 302, the Private Legacy Assets 306, and the Public Legacy Assets 308.

In certain embodiments, Applicant's case management tool 106 comprises computer readable program code to calculate and display using an area chart showing a Net Ann Living Income Needed. In certain embodiments, Applicant's case management tool 106 comprises computer readable program code to calculate and display using an area chart showing a Total Living Assets Needed.

In certain embodiments, Applicant's case management tool 106 comprises computer readable program code to calculate and display a deficit analysis based upon the Principal as survivor. In certain embodiments, Applicant's case management tool 106 comprises computer readable program code to calculate and display a deficit analysis based upon a spouse as survivor.

For illustrative purposes only, the predetermined threshold of the step 408 is depicted as a minimum threshold in the FIG. 4. Here, if the value of the Legacy Assets 304 is greater than the predetermined threshold, the method 400 moves from the step 408 to the step 410. Alternatively, if the Legacy Assets is less than or about equal to the predetermined threshold, then the method 400 moves from the step 408 to the step 418.

When the value of the Legacy Assets 304 is greater than the predetermined threshold, Applicant's case management tool 106 determines values for the Private Legacy Assets 306 and the Public Legacy Assets 308 without (pie chart 300 in FIG. 3a) and with (pie chart 310 in FIG. 3b) the carve out 314. In the step 410, Applicant's case management tool 106 determines a first Private Legacy Assets 306 and a first Public Legacy Assets 308 portions of the Legacy Assets 304 without the carve out. The first Public Legacy Assets 308 is calculated to be a projected or estimated tax liability value that a governmental agency will impose on the Legacy Assets 304. To illustrate, if the value of the Legacy Assets 304 at the end of the life expectancy period is extrapolated to be $US1,000,000 and an estate tax rate is predefined as 45%, then the first Public Legacy Assets 308 would equal about $US450,000 (45%×$US1,000,000). As stated previously, the first Private Legacy Assets 306 can be calculated as the remainder after the first Public Legacy Assets 308 is deducted from the value of the total assets (=$US1,000,000-$US450,000). In this example, the first Private Legacy Assets 306 is equal to about $US550,000.

At the step 412, Applicant's case management tool 106 determines a value for a carve out to be taken from the first Public Legacy Assets 308 (e.g., 0% to 100% of the first Public Legacy Assets 308). In one implementation, Applicant's case management tool 106 receives the value for the carve out from the member computing device 102 at the step 404. Alternatively, or in combination, Applicant's case management tool 106 may determine the value of the carve out 314.

At a step 414, Applicant's case management tool 106 uses the value of the carve out to determine a second Private Legacy Assets 306 and a second Public Legacy Assets 308 portions of the Legacy Assets 304. For example, Applicant's case management tool 106 may subtract the value of the carve out 314 from the first Public Legacy Assets 308 (shown as portion 312 in pie chart 310 of FIG. 3b). Applicant's case management tool 106 then simulates investment of the carve out 314 as payment toward premiums of a life insurance policy over a period of time, such as for the duration of the defined window of time. The return on investment, here proceeds of the life insurance policy, is then determined to be part of the second Private Legacy Assets 306. Referring to FIG. 3b, the pie chart 310 shows the second Private Legacy Assets 306 including the first Private Legacy Assets 306 (the portion 318) and the value of the proceeds from the life insurance (the portion 316).

In another implementation, Applicant's case management tool 106 does not receive the value of the carve out, at the step 402 in FIG. 4. Rather, Applicant's case management tool 106 selects a minimum value of the carve out that would maximize the second Private Legacy Assets 306 while minimizing the second Public Legacy Assets 308. For example, an Applicant's case management tool 106 may determine that monthly premiums of $US100 made toward a life insurance policy for the duration of the predefined window of time (e.g., life expectancy period) would result in a 5% increase in the Private Legacy Assets 306 while decreasing the Public Legacy Assets 308 by 15%. See FIGS. 3a.

Determining the maximum Private Legacy Assets 306 may be an iterative processes. The case management tool 106 may, for example, calculate the return on investment using the Legacy Assets value (the investment corpus life expectancy value) and the estimated post-mortem tax liability for each of the scenarios: (1) without the carve out 314 and (b) with the carve out that is invested in a life insurance policy, for example. The case management tool 106 may calculate a differential that is the difference between the return on investments for (a) and (b) above. The value of the carve out 314 may then be adjusted to increase or maximize the differential.

In some implementations, the investment of the carve out 314 not only changes the distribution between the Private Legacy Assets 306 and the Public Legacy Assets 308, but also increases the value of the total assets, for example an investment in a life insurance policy that has a maturity value that exceeds the total premiums paid toward the life insurance. To illustrate the value of the total assets may be $US1 million (dollar value of the pie chart 300) without the investment of the carve out 314 (e.g., $US100,000) in the life insurance policy. However, the asset holder invests the carve out 314 of $US100,000 into a $US500,000 life insurance policy. Here, because the proceeds of the life insurance policy ($US500,000) exceed the value of the carve out 314 ($US100,000), the value of the total assets increases, which would be $US1,400,000 (=$US1,000,000−$US100,000+$US500,000) in this example.

At the step 416 Applicant's case management tool 106 facilitates the rendering of the second Private Legacy Assets 306 and the second Public Legacy Assets 308. For example, Applicant's case management tool 106 may send a transmission for delivery to the member computing device 102 via the network 104 and/or the user computing device 116 via the network 114 that can be rendered as an image, such as by using a browser.

When the Legacy Assets 304 is less than or about equal to the threshold, then the method 400 moves from the step 408 to the step 418. For example, when the asset holder has a deficit Legacy Assets 304, then Applicant's case management tool 106 simulates how to invest the carve out 314 to create a Private Legacy Assets 306. At the step 418, Applicant's case management tool 106 determines the value for the carve out 314. As stated previously, the value of the carve out may be sent to Applicant's case management tool 106, Applicant's case management tool 106 may determine the carve out 314, or a combination thereof. Here, however, the carve out 314 is simulated as been taken from the Living Assets 302 of the asset holder. At a step 420 Applicant's case management tool 106 determines a Private Legacy Assets 306 and a Public Legacy Assets 308 when the carve out 314 is taken from the Living Assets 302 of the asset holder. At a step 422, Applicant's case management tool 106 facilitates the rendition of the Private Legacy Assets 306 and the Public Legacy Assets 308 determined in the step 420. As stated previously, the rendering can occur on a member computing device 102, the user computing device 116, or a combination thereof.

In some implementations, Applicant's case management tool 106 may transmit an alert about the investment strategy of the asset holder to the member computing device 102, the user computing device 116, or both. For example, the user computer device 216 may receive a transmission indicating that the value of the total assets of the asset holder has increased due to a change in the stock value in one of the asset holder's stocks or that a life insurance policy now has a feature that the asset holder may be interested in.

Figure 56:
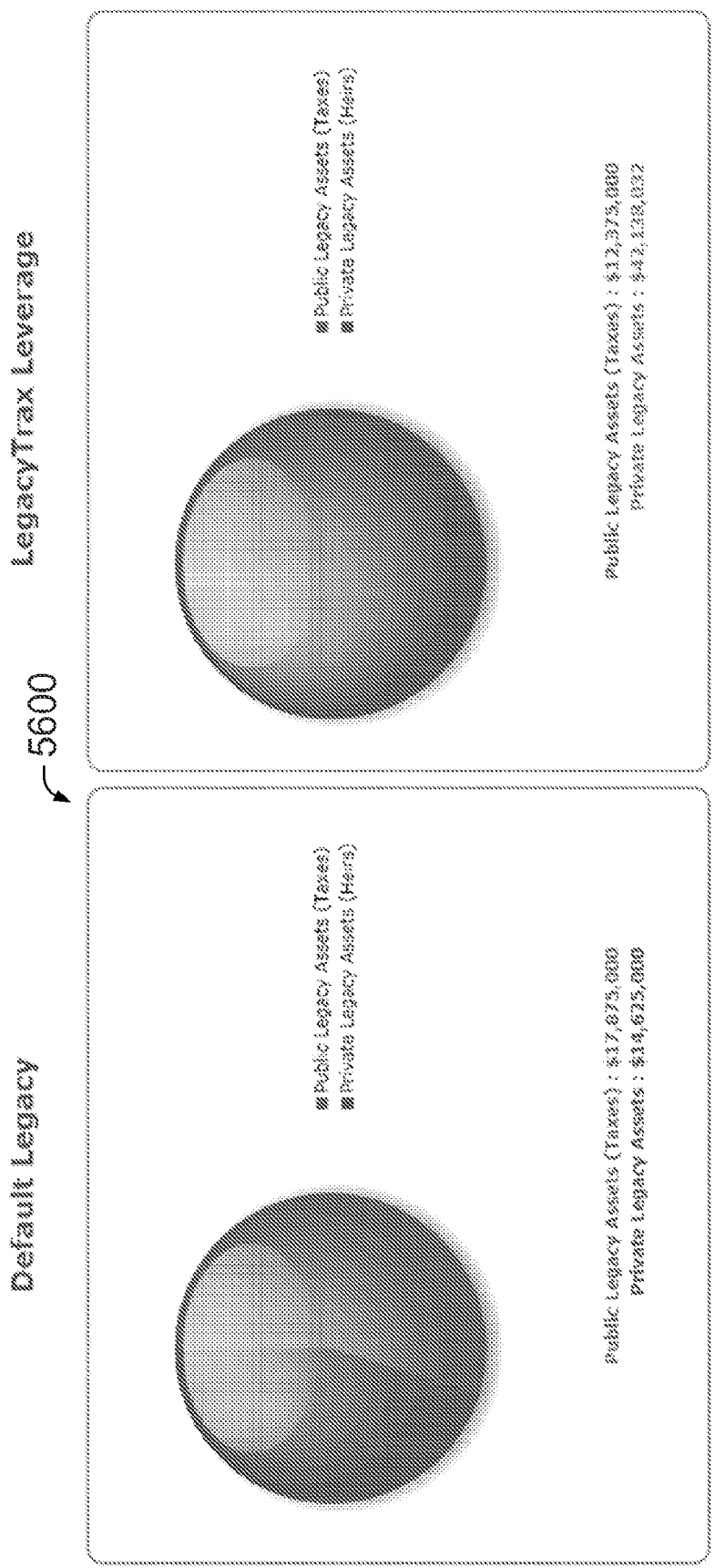

FIGS. 5-56 present screen shots of computer device rendered interfaces associated with Applicant's case management tool 106. Each of FIGS. 5-56 illustrates a graphical user interface generated and displayed using Applicant's case management tool 106, member computing device 102, or user computing device 116, for example. In FIGS. 5 through 12, a user or member may log onto a secure website to access Applicant's case management tool 106 and enter data about the assets and financial goals of an asset holder into data entry fields. FIGS. 13 through 21 illustrate various interfaces for conveying the dual asset investment strategy model. FIGS. 22 through 27 illustrate various interfaces for simulating an asset investment strategy for the asset holders based on the data received about the asset holders. FIGS. 28 through 40 and FIGS. 52-56 illustrate various interfaces for conveying a rate of return for various asset investment strategy when the Legacy Assets 304 is equal or more than zero (surplus). In FIGS. 41 through 45 various exemplary screen shots show investment strategies when the Legacy Assets 304 is less than zero (deficit). FIGS. 46 through 51 illustrate various exemplary forms for collection of the information about the asset holders via a hard copy document.

The following example illustrates using the system 100 to apply the methods 200 and 400 or other methods or processes herein described in order to determine a rate of return on investment into a life insurance policy. The example is non-limiting and is for illustrated purposes only.

EXAMPLE

Sale Of Life Insurance

FIGS. 5-56 present screen shots of interfaces associated with Applicant's case management tool 106. Applicant's case management tool 106 facilitates the rendition of the respective interfaces upon one or more of the member computer devices 102 or user computer devices 116. The member or the user may interact with the interfaces to input data about the asset holder, display results from calculations based on the input data, convey benefits and drawbacks of various investment strategies, or illustrate the advantages of investing in life insurance as part of an investment strategy, for example. In the illustrated example, a vendor renders the screen shots on the vendor computing device 122 while advising asset holders Ed and Edna Estateowner. Here, the vendor advises the Ed and Edna Estateowner to invest in life insurance in order to optimize their Private Legacy Assets 306 while minimizing their Public Legacy Assets 308 and maintaining their Living Assets 302. In certain embodiments one or more inputs to the interfaces of FIGS. 5-56 are variable and in other embodiments one or more inputs are preselected at a set amounts.

Figure 5A:
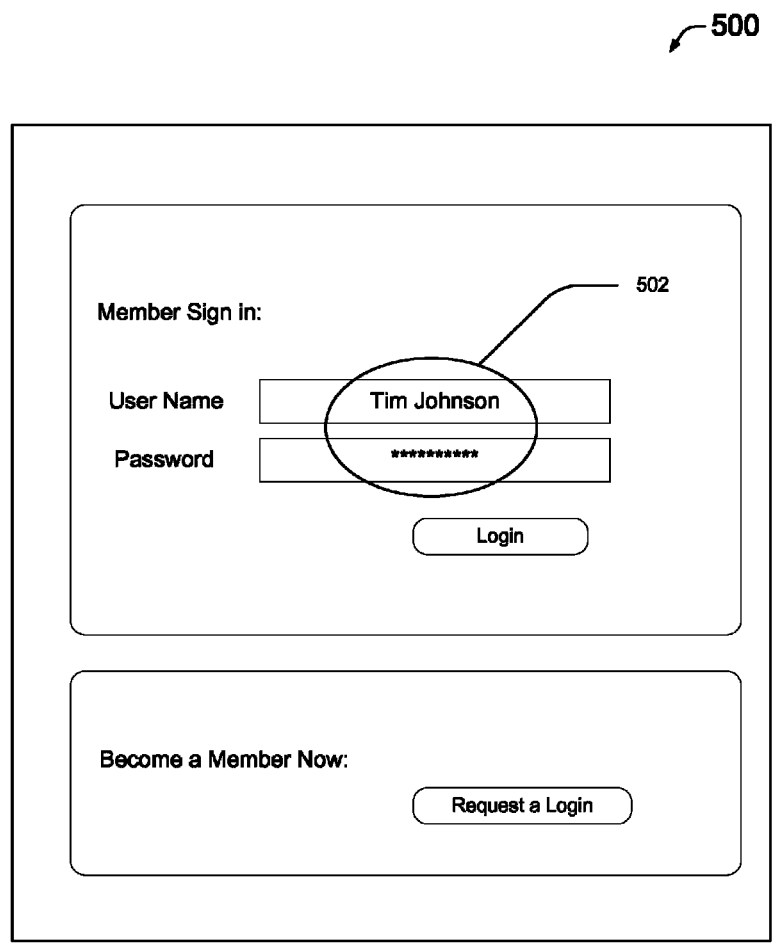
FIGS. 5-56 each illustrate an exemplary screen shot rendered upon a member computing device or user computer device in the system of FIG. 1.

FIG. 5a is a screen shot illustrating a browser rendered input interface 500 of a secure website allowing a member to log in and access Applicant's case management tool 106. Here, the vendor, Tim Johnson 502, has used the network 104, such as the Internet, to connect to the secure website in order to log on and access Applicant's case management tool 106. As stated previously, each member may have a different level of access, usage scope, or rights associated with Applicant's case management tool 106. FIG. 5b and FIG. 5c are each a screen shot illustrating a browser rendering interface 510 and 520, respectively, of Financial Professional Resources. FIG. 5d is a screen shot illustrating a browser rendering interface 530 of existing reports.

Figure 7:
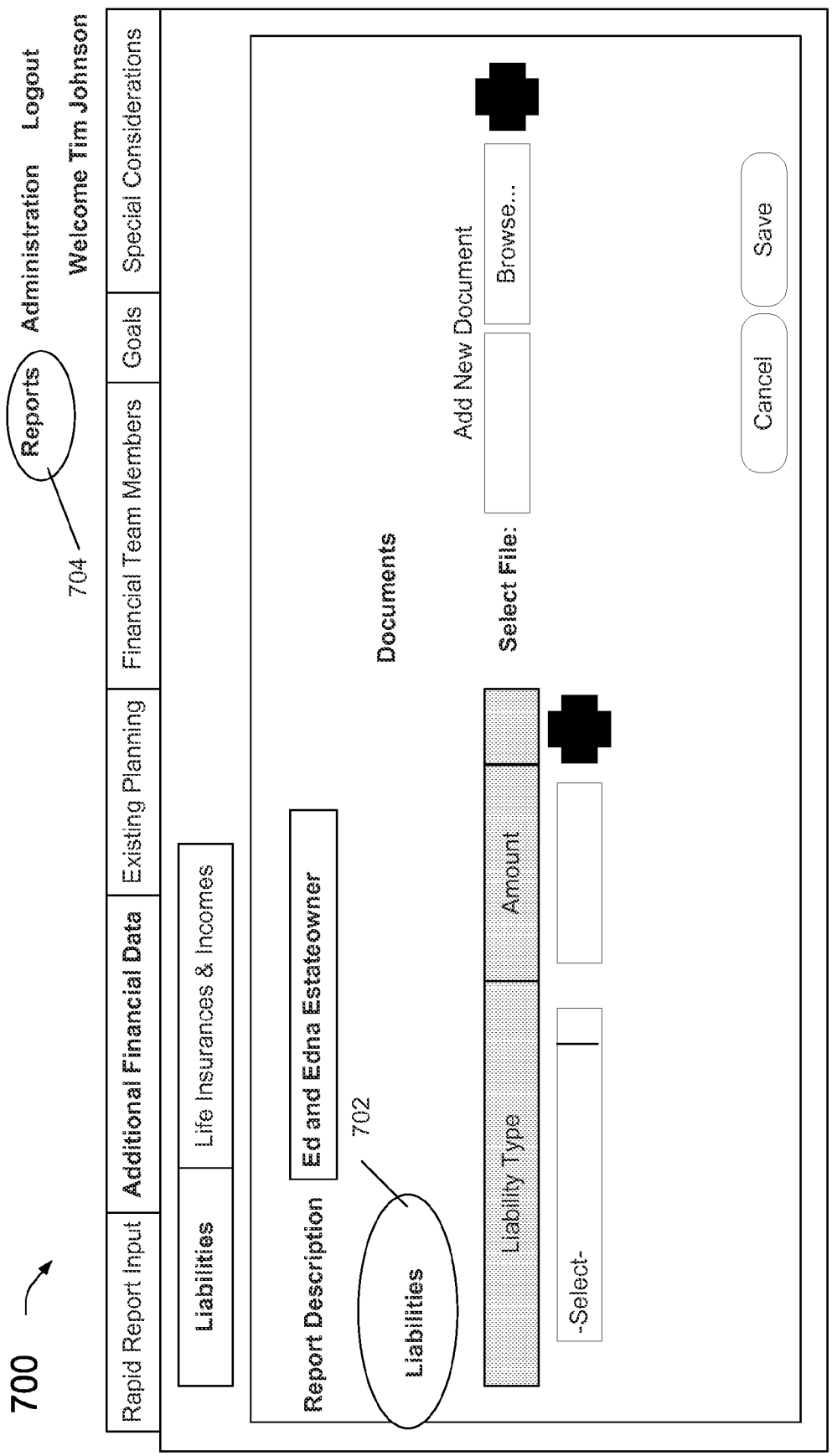

FIGS. 6 through 9 illustrate various input interfaces for collection of data about the asset holders (e.g., step 202). FIG. 6 illustrates an input interface 600 for data entry about the assets of the asset holder. The interface 600 has various sheets or data entry locations. In the illustrated implementation, Tim Johnson has entered information about asset holders Ed and Edna Estateowner. The assets 602 of Ed and Edna include: Cash & Equivalents 604 worth $US3,000,000; Stocks 606 worth $US8,500,000; Bonds 608 worth $US4,200,000; Real Estate 610 worth $US6,000,000; Business Holdings 612 worth $US14,000,000; Retirement 614 worth $US1,500,000; and other assets 616 worth $US1,000,000. The vendor may also enter the Rate of Return 618 for each respective asset. The vendor may also enter some default values 620, such as a value for the carve out 314 illustrated as $US10,000,000b (element 622); an annual Living Income needs illustrated as $US250,000/yr (element 624), which is part of the Living Assets 302; a rate of the income tax 626, illustrated as 38%; a rate of the estate tax 628 illustrate as 45%; a life expectancy period 630 illustrated as 33 years; a rate of inflation 632 illustrated as 2.5%; a value for annual premiums of a life insurance 634 illustrated as $US272,539; and a face amount 636 illustrate as $US50,000,000. A link to Instructions 638 leads to more data shown in FIG. 6b. Alternatively, or in combination, the default values 620 may be pre-populated by Applicant's case management tool 106. The data entered in the input interface 600 may be saved. FIG. 7 illustrates a data input interface 700 including a data entry field for information about the liabilities 702 of Ed and Edna Estateowner. Here, the vendor may create and render reports 704 about Ed and Edna Estateowner's assets. FIG. 8 illustrate a input interface 800 for entering data about the current life insurance policies 802 held by the asset holders, Ed and Edna Estateowner and their respective incomes. FIG. 9 illustrates another input interface 900 for entering data about the asset holder's estate plan 902.

In certain embodiments, Applicant's case management tool 106 includes an Estate Tax Exclusion field as an input field. In certain embodiments, Applicant's case management tool 106 includes computer readable program code to display the value input as an Estate Tax Exclusion.

Figure 10:
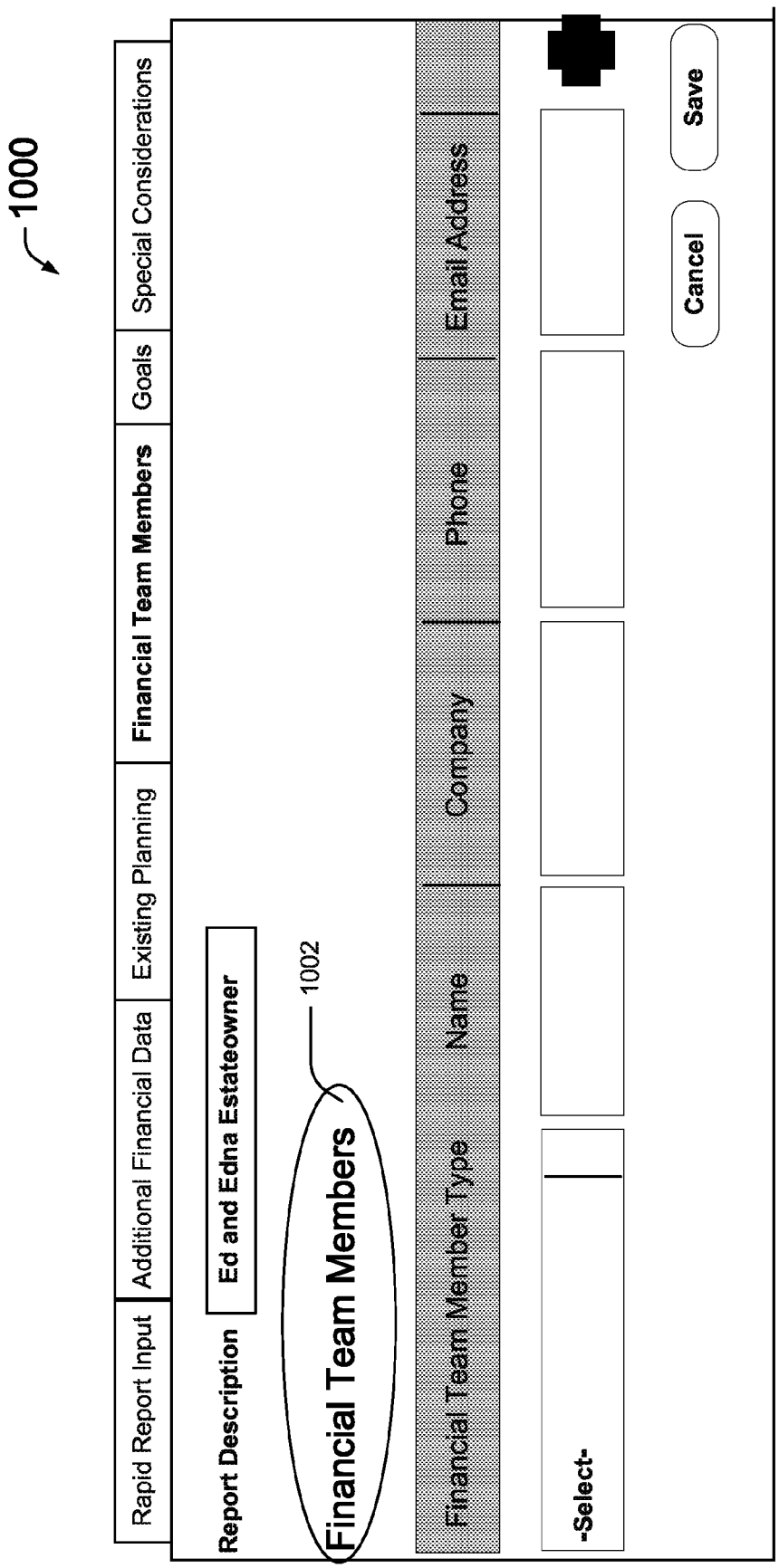
Figure 11:
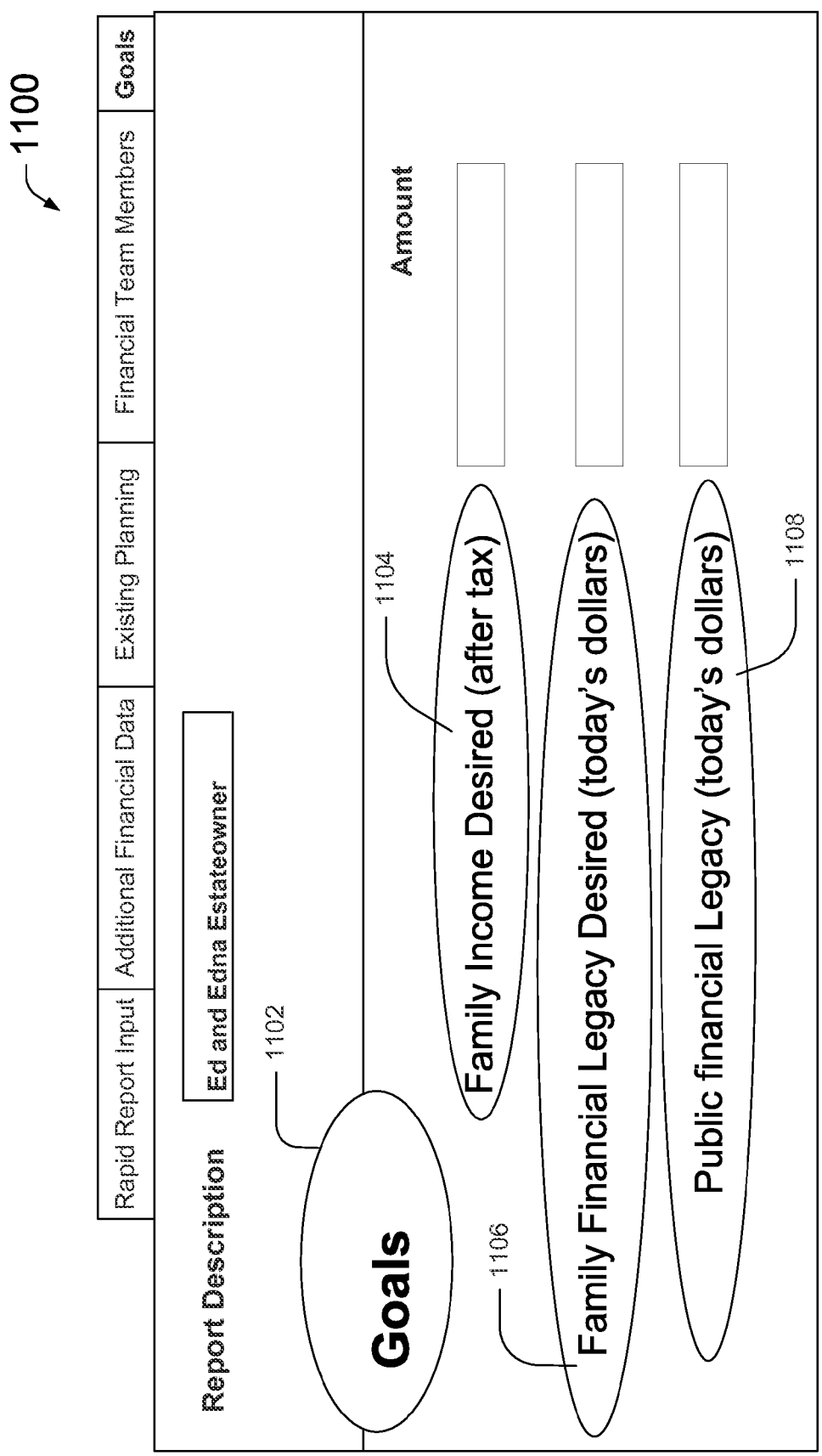
Figure 12:
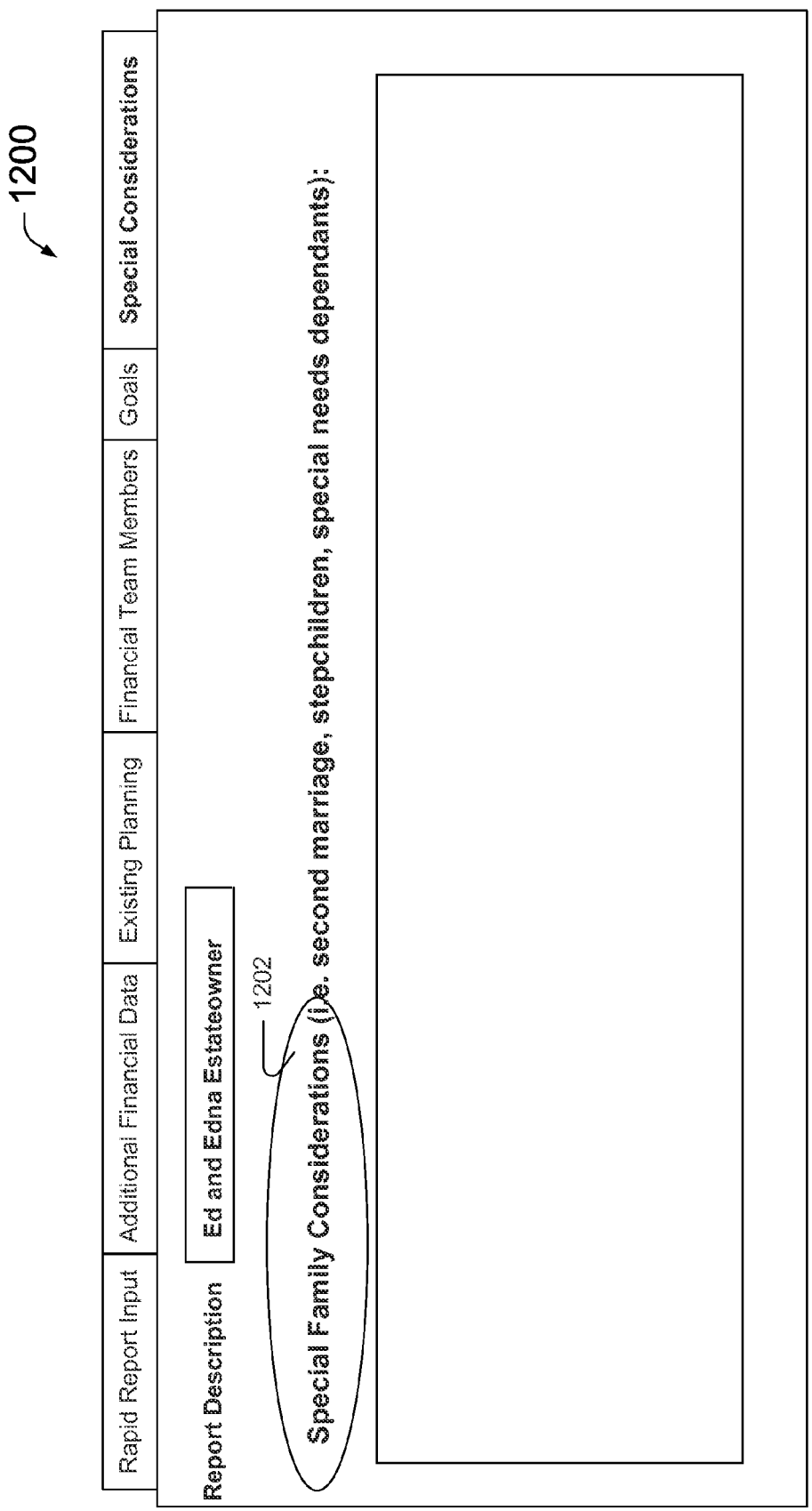

FIGS. 10 through 12 illustrate various input interfaces for delineating the goals of the asset holders and creating a financial advisory team for the asset holder. FIG. 10 illustrates an input interface 1000 for selecting the financial team members 1002. Here, the vendor may select various individuals that may act as the mentor, manager, accountant, or lawyer, for example, that will collaboratively create the financial strategy for the asset holder. FIG. 11 illustrates an input interface 1100 for delineating the goals 1102 of the asset holders. For example, the vendor may consult with Ed and Edna Estateowner to determine and enter the desired family income 1104, the desired family financial legacy 1106, and the public financial legacy 1108 into the respective data entry fields of the input interface 1100. The special family considerations 1202 for Ed and Edna Estateowner may also be entered into another input interface 1200 in FIG. 12.

Figure 13:
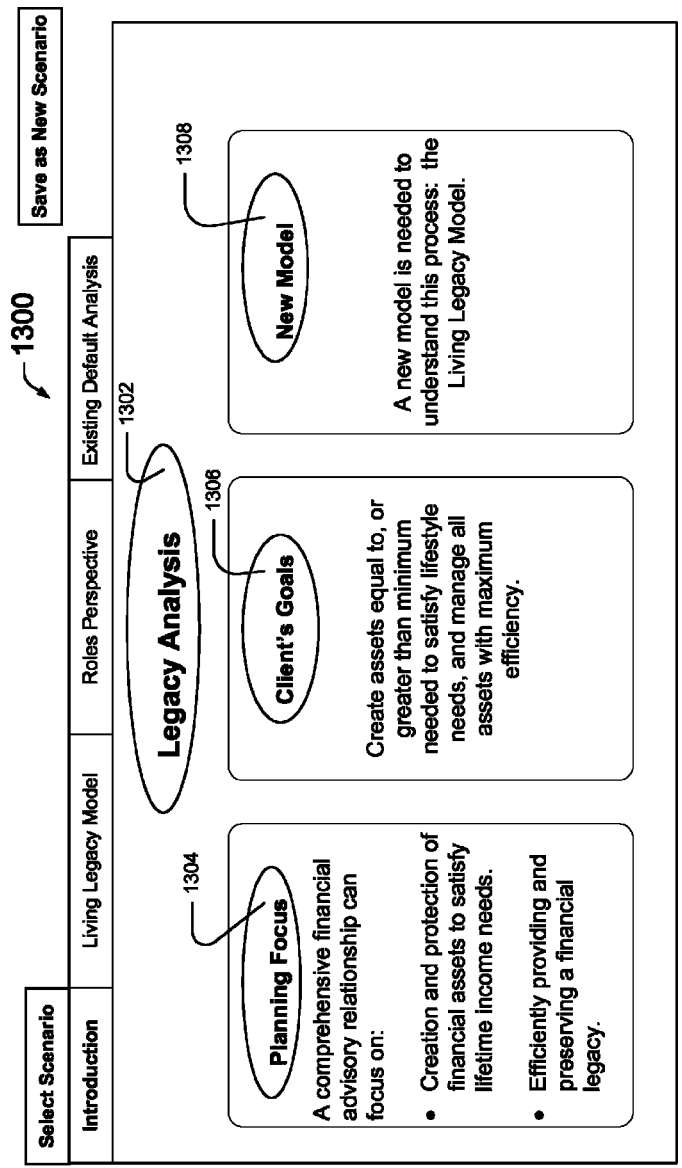
Figure 14:
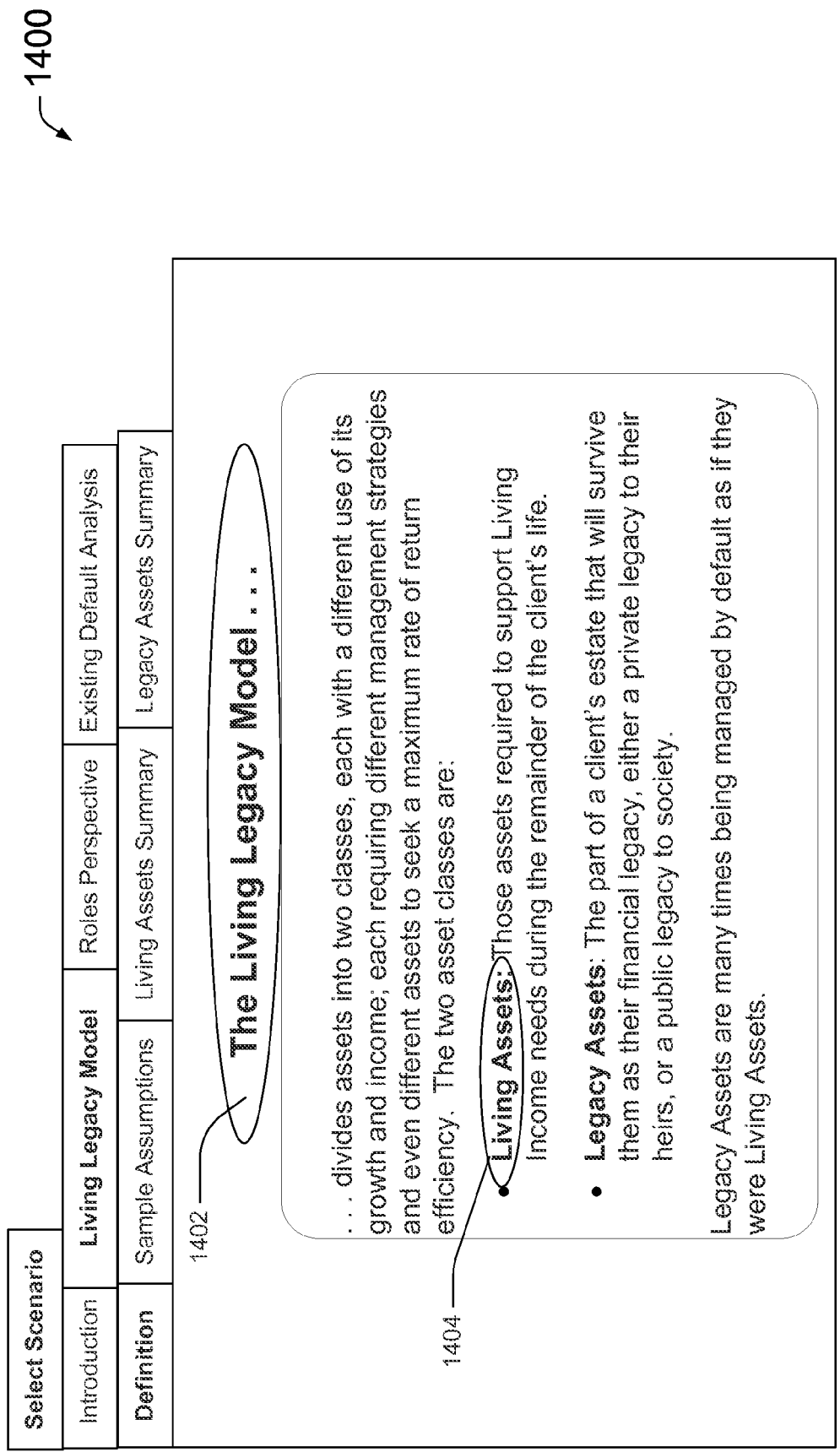
Figure 15:
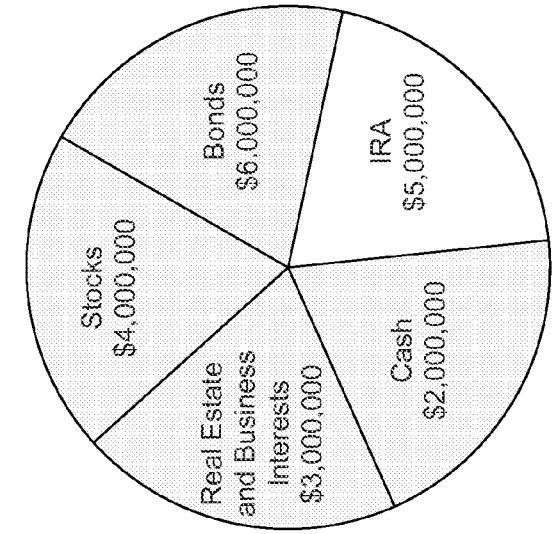
Figure 16:
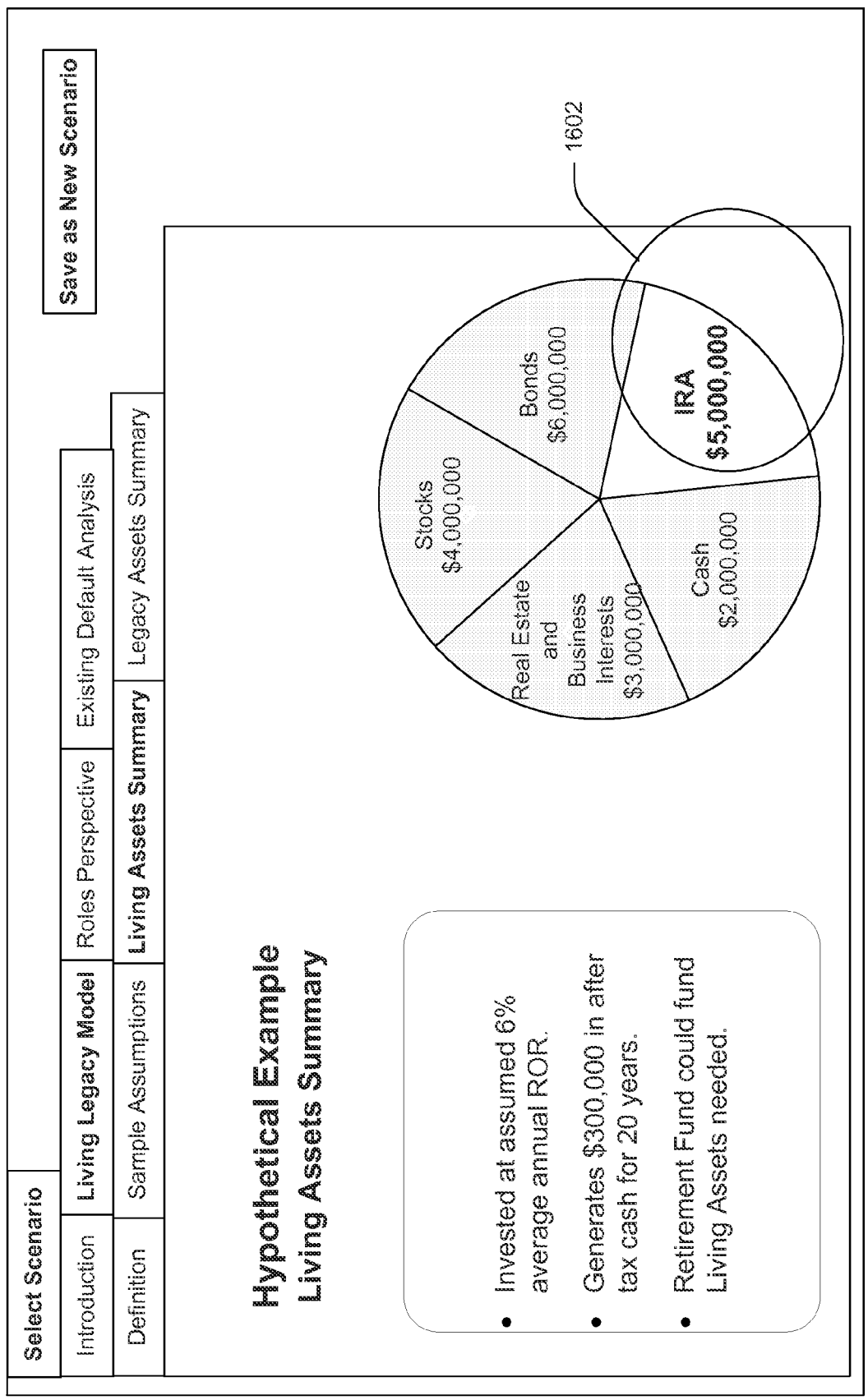
Figure 17:
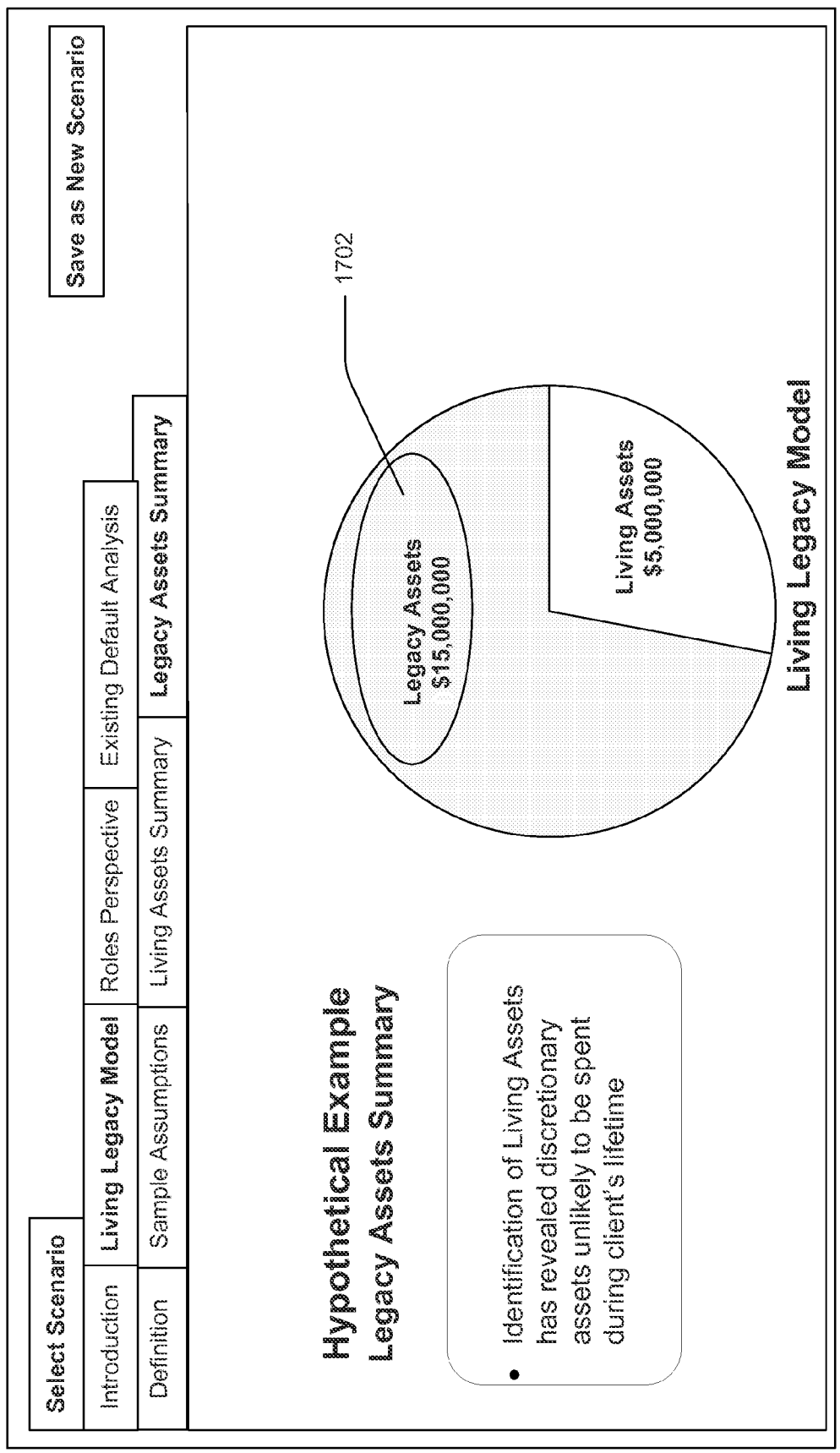

FIGS. 13 through 21 illustrate various interfaces for conveying the dual asset investment strategy model to the asset holders. FIG. 13 illustrates an interface 1300 that conveys the concepts behind a legacy analysis 1302. Here, the vendor may relay to Ed and Edna Estateowner that the planning focus 1304 for them can be to secure enough assets for their lifetime income needs while also preserving an optimum financial legacy. The vendor discusses Ed and Edna's goals 1306 and present a new model 1308 that describes the dual asset investment strategy. The vendor then explains, via the interface 1400 of FIG. 14, that the Living Legacy Model 1402 categorizes their current assets into two classes: Living Assets 302 and Legacy Assets 304 (described in FIG. 14 as "Legacy Assets" 1404) because their Living needs and desired legacy are best managed differently in order to maximize their returns. The vendor may then illustrate, via interface 1500 of FIG. 15, a distribution of assets in a hypothetical case with sample assumptions 1502. The vendor may then illustrate that, in the hypothetical case, the total assets of the asset holders far exceed the Living Income needs of the asset holders. As shown in FIG. 16 in the interface 1600, the Individual Retirement Account (IRA) 1602 of $US5,000,000 of the asset holder is sufficient to cover the Living Income needs of the asset holders. This leaves, as illustrated by the interface 1700 of FIG. 17, a substantial amount of assets that will survive the asset holder, shown as Legacy Assets 1702 (valuing $US15,000,000). The vendor then may explain the dual asset investment model further through an analogy. As shown in FIGS. 18, 19, 20, and 21 each illustrating interfaces 1800, 1900, 2000, and 2100, respectively, that present a dialog box conveying a corporate analogy of representing the asset holder as "UCorp."

Figure 22:
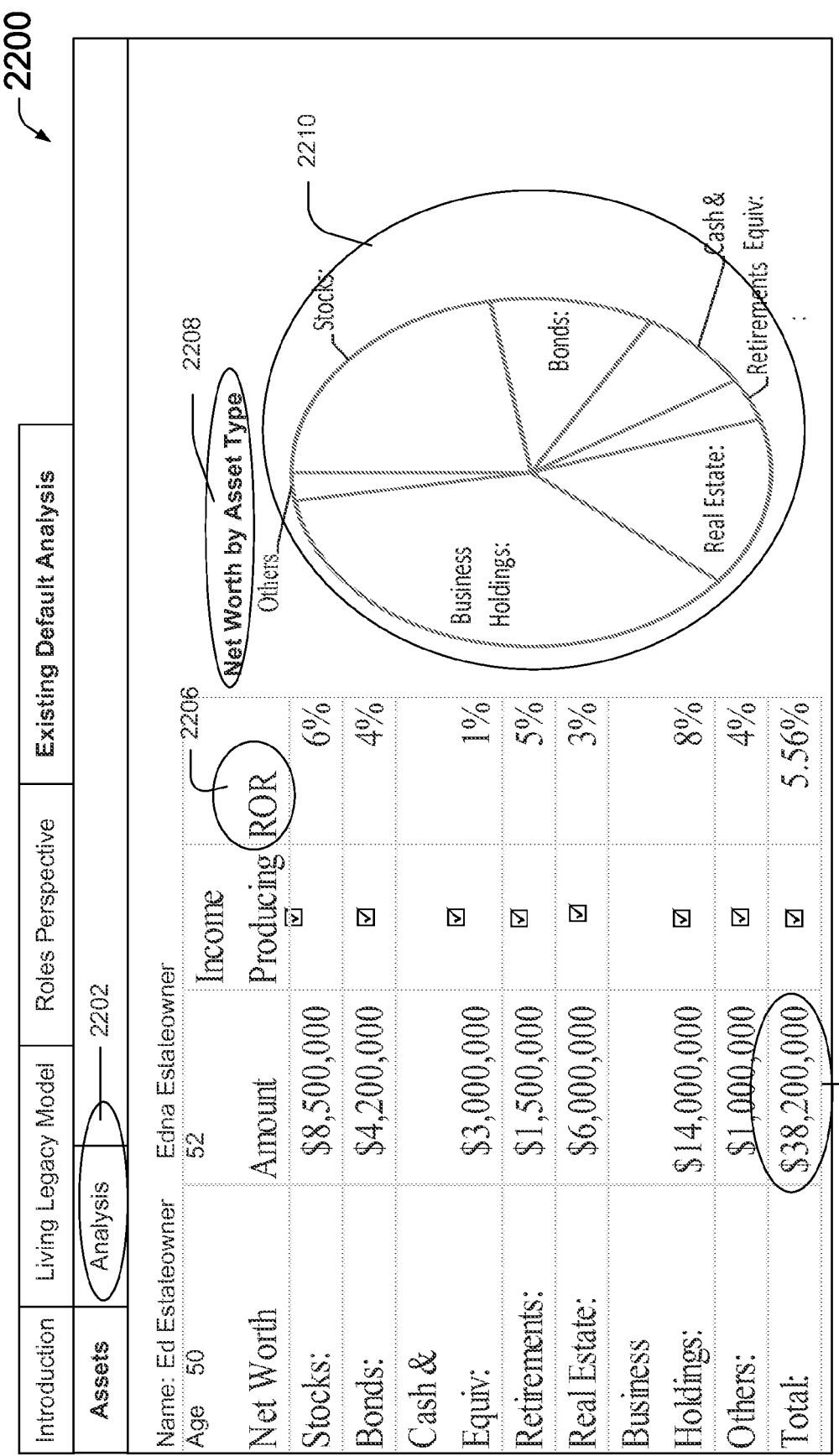
Figure 23:
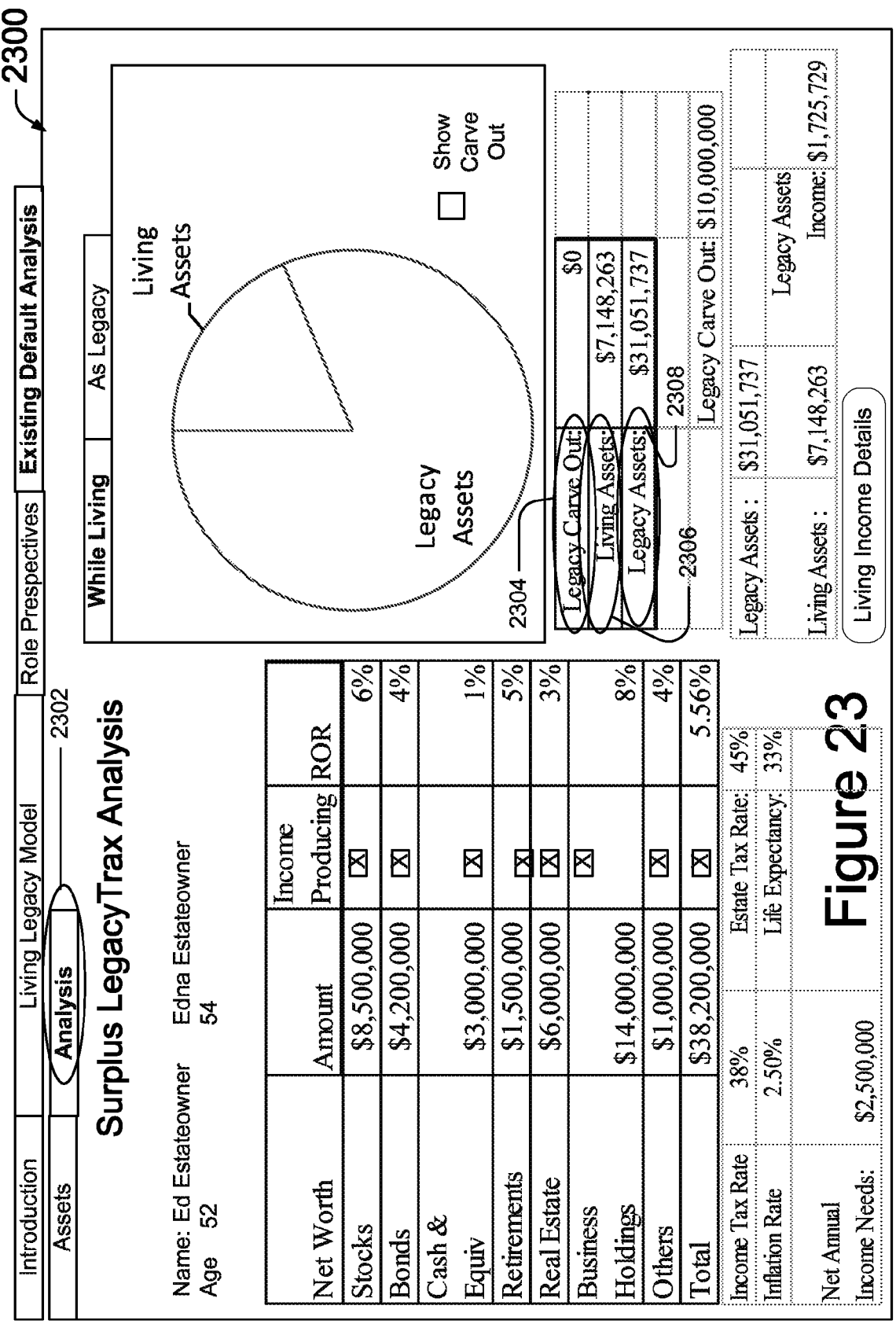
Figure 24:
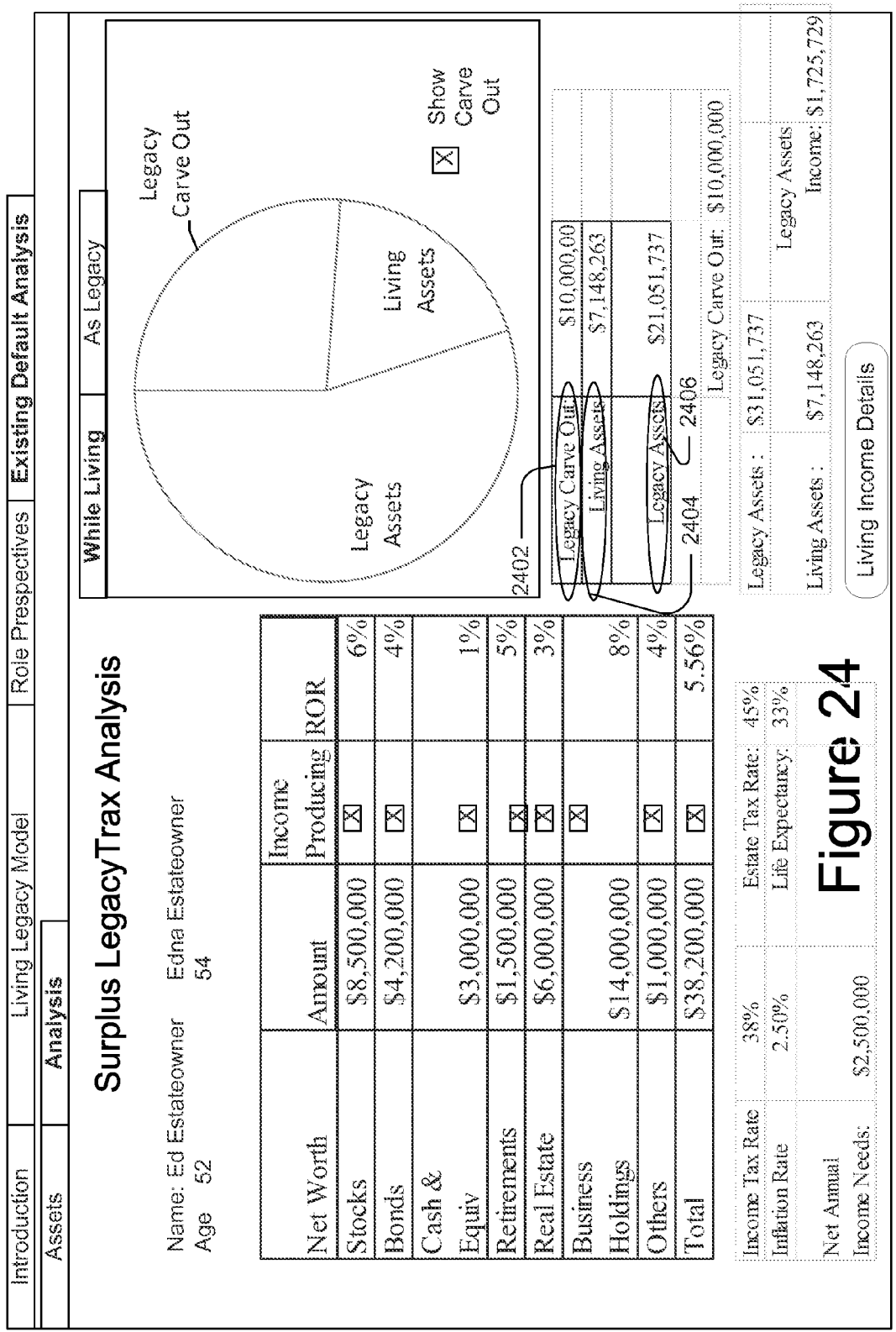

FIGS. 22 through 27 illustrate various interfaces for simulating an asset investment strategy for the asset holders based on the data received about the asset holders (e.g., the step 402 of FIG. 4 and FIGS. 6 through 9 above). FIG. 22 illustrates an input interface 2200 for Assets 2202. In the illustrated embodiment of FIG. 22, Ed and Edna Estateowner's Net Worth 2204 totals $38,200,000. The value of the assets and the corresponding Rates of Return 2206 may be entered for each asset listed or retrieved from previously entered data (e.g., FIG. 6) that was stored in the data repository 112 (e.g. FIG. 2 steps 204 or 218). As illustrated in FIG. 22, the respective values are all adjustable. The vendor and Ed and Edna Estateowner may adjust any one or more of these values and recalculate the resulting values and charts shown on display screen portions. Here, the distribution of the Net Worth 2208 is calculated and illustrated in pie chart 2210. FIGS. 23 through 27 illustrate various data interfaces using Analysis 2302. Here, the vendor discusses the impact of the carve out 314 upon the distribution of Ed and Edna's assets into the Living Assets 302 and the Legacy Assets 304 while Ed and Edna are living (FIGS. 23 and 24) and after their death (FIGS. 26 and 27), as their legacy. In FIG. 23, the interface 2300 graphically illustrates the distribution of Ed and Edna's assets while they are alive without the carve out 314 (shown as Legacy Carve Out 2304 $US0). In FIG. 24, the interface 2400 graphically illustrates the distribution of their assets while they are alive with the carve out 314 (shown as Legacy Carve Out 2402 $US10,000,000). For both scenarios, the Living Assets 302 remains the same, $US7,120,424 (elements 2306 and 2404, respectively); however, without the carve out 314, the Legacy Assets 304 is worth $US31,079,576 (shown as "Legacy Assets" 2308) while with the carve out 314, the Legacy Assets 304 is worth $US21,079,576 (shown as "Legacy Assets" 2406). This occurs because in FIG. 24, the carve out 314 is taken from the Legacy Assets 304 ($US21,079,576=$31,079,576−$10,000,000). In FIG. 25 an interface 2500 illustrates a possible chronology for withdrawal 2502 of Ed and Edna's Living Assets 302 during their life time.

Figure 27:
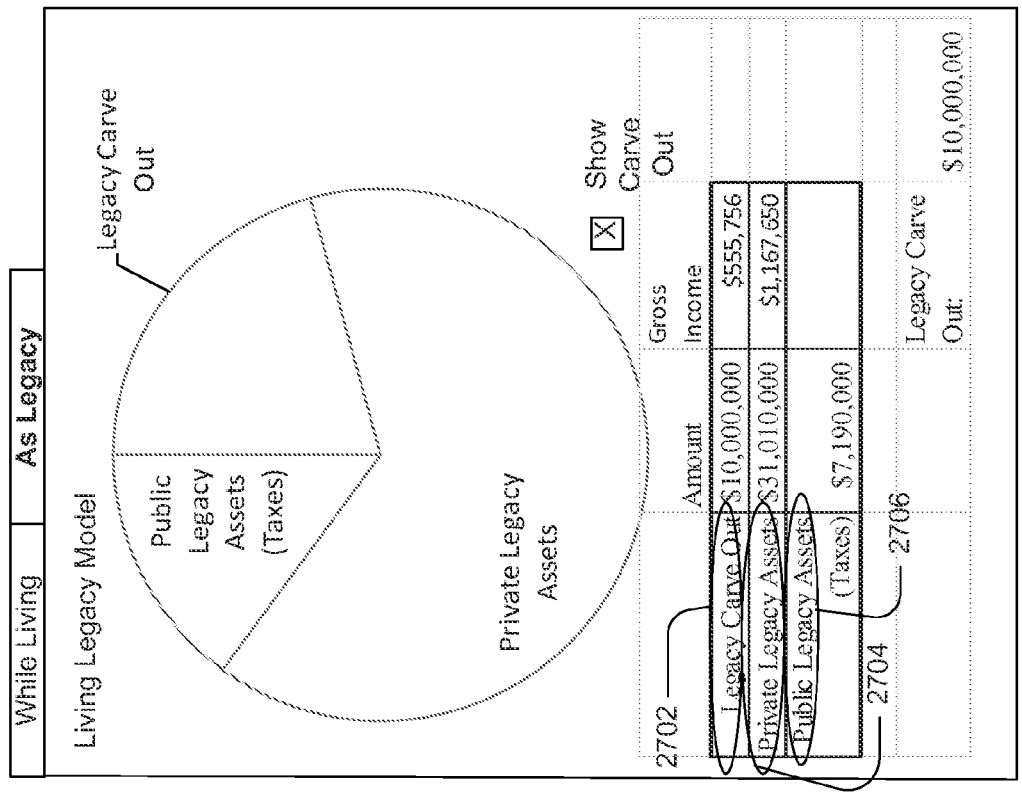

FIGS. 26 and 27 illustrate various data interfaces that show the distribution of Ed and Edna's assets into Public Legacy Assets 308 and Private Legacy Assets 306 after their death, as their legacy. In FIG. 26, the interface 2600 graphically illustrates the distribution without the carve out 314 (shown as Carve Out 2602 $US0). Here, the Private Legacy Assets 306 is illustrated to be $US21,010,000 (shown as "Private Legacy Assets 2604) and the Public Legacy Assets 308 is illustrated to be $US17,190,000 (shown as "Public Legacy Assets (Taxes) 2606). Therefore, after Ed and Edna's death, their $38,200,000 of assets are distributed such that their heirs will receive $US21,010,000 and $17,190,000 is paid as estate tax. In FIG. 27, the interface 2700 graphically illustrates the distribution of Ed and Edna's assets with the carve out 314 (shown as Carve Out 2702 $US10,000,000). Here, the Private Legacy Assets 306 is still illustrated to be $US21,010,000 (shown as "Legacy Assets 2704) but the Public Legacy Assets 308 is illustrated to be $US7,190,000 (shown as "Public Legacy Assets (Taxes) 2706). This occurs because, in FIG. 27, the carve out 314 was taken out of the Public Legacy Assets 308 portion of the Legacy Assets 304. Therefore, Ed and Edna's $38,200,000 of assets are distributed such that their heirs will receive $US21,010,000 and only $7,190,000 is paid as estate tax ($US10,000 less than when without the carve out 314).

Figure 28:
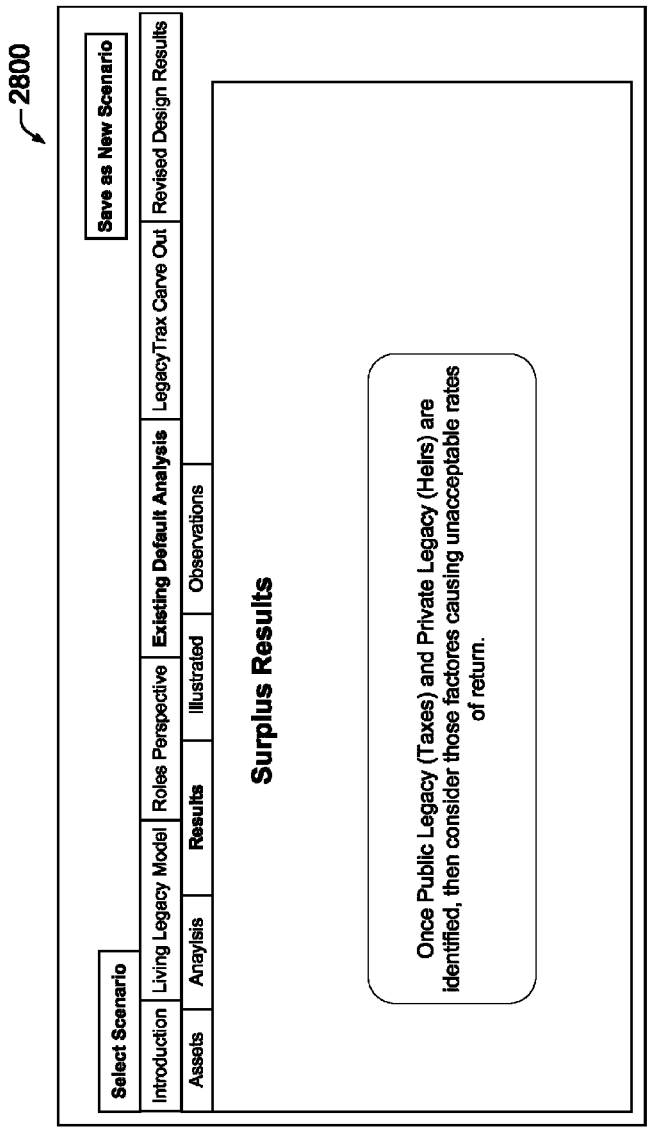
Figure 29:
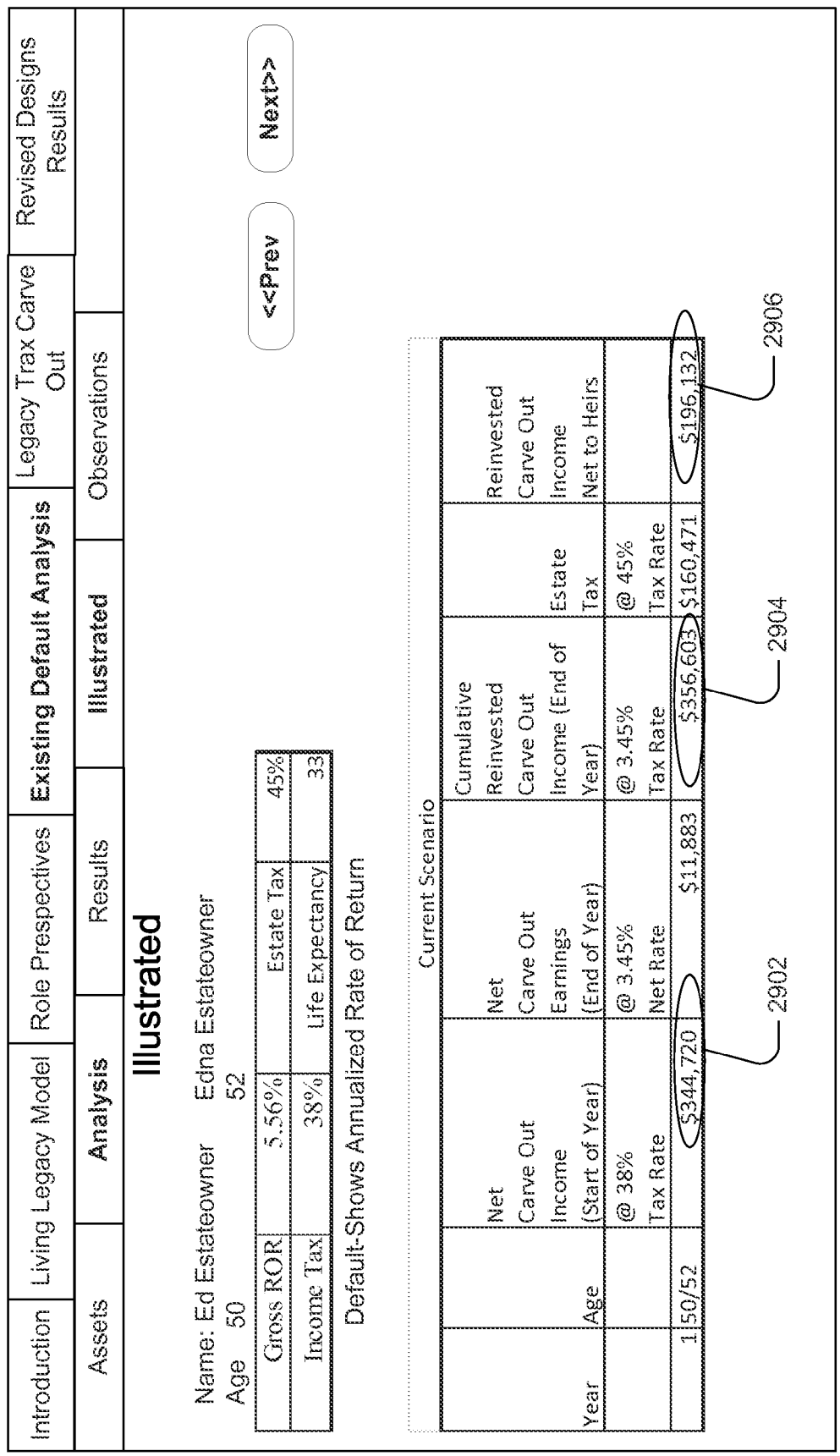

FIGS. 28 through 40 illustrate various interfaces for conveying a rate of return for various asset investment strategy when the Legacy Assets 304 is equal or more than zero (surplus). FIGS. 28 through 31 illustrate various data interfaces that can be used to explaining the rate of return that Ed and Edna Estateowners would receive with a conventional asset investment strategy the surplus Legacy Assets 304. In FIG. 28, the interface 2800 illustrates a dialog box leading to a rate of return analysis of Ed and Edna's asset for a variety of investment strategies. In FIG. 29, the interface 2900 tabulates Ed and Edna's contributions to their heirs if the carve out 314 is invested as installments into a conventional investment program with a 3.45% rate of return. In the first year, if Ed and Edna invest $US344,720 (element 2902) of the $US10,000,000 carve out 314 into the conventional investment program, then the total value of the investment at the end of the year is equal to $US356,603 (element 2904). However, because the estate tax is 45%, if Ed and Edna were to die at the end of the first year, then their heirs would only receive $US196,132 (element 2906). FIG. 30 tabulates a similar analysis for subsequent years of installments into a conventional investment program in interface 3000. In FIG. 31 the interface 3100 further tabulates a calculated rate of return that Ed and Edna's would receive if the carve out 314 is invested as chronological installments into the conventional investment program with the 3.45% rate of return. For example, in year 1, Ed and Edna's $US344,720 installment resulted in $US196,132 (element 3102) being transferred to their heirs after their deaths. This results in a −43.00% rate of return 3104 on their investment (−43%=100×(1−196132/344720)). Although the rate of return improves in each successive year, it is not optimum. For example, at the end of Ed and Edna's life expectancy period of 33 years, their rate of return for investing the carve out in a conventional investment programs results in only 0.3% (rate of return 3106).

Figure 34:
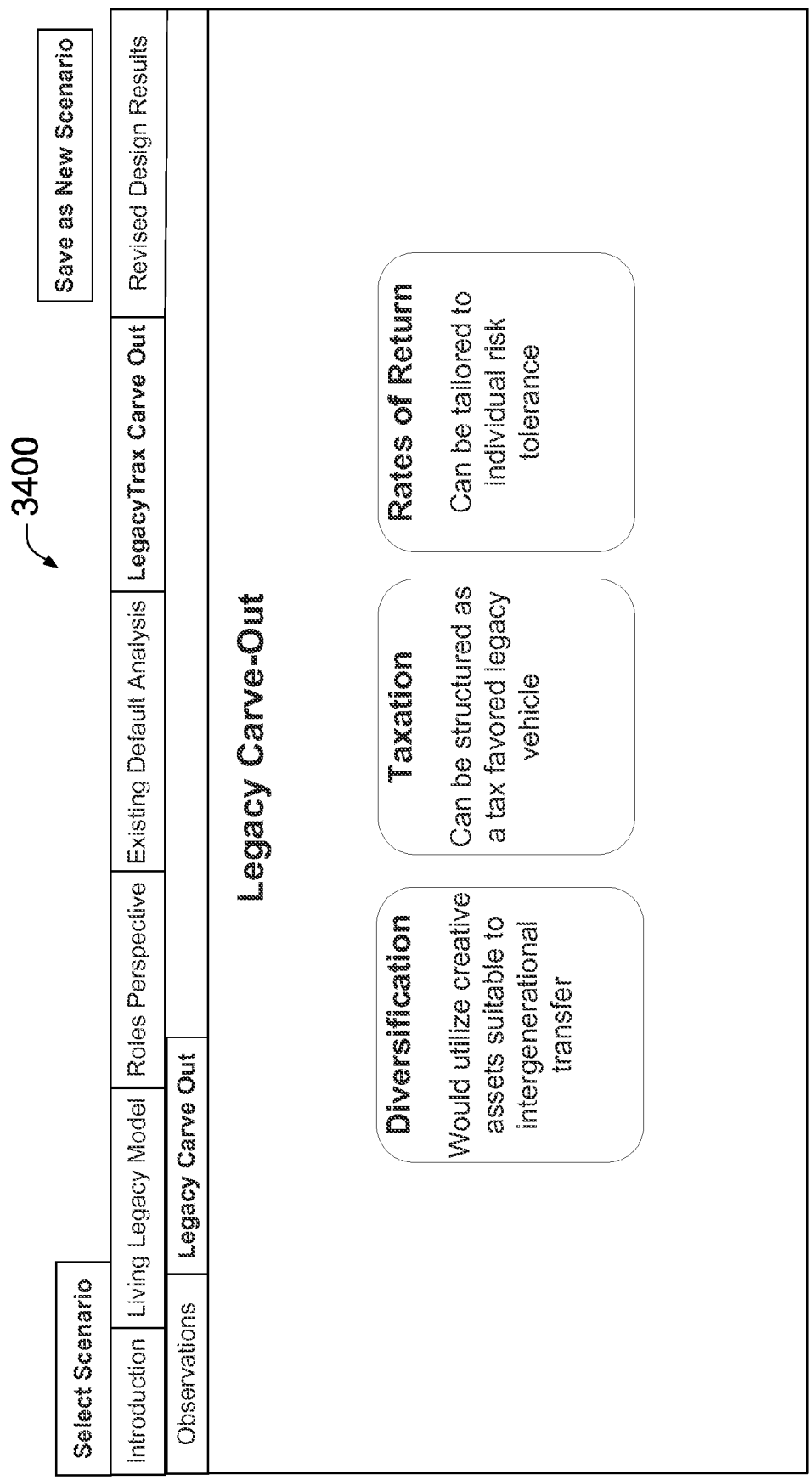
Figure 35:
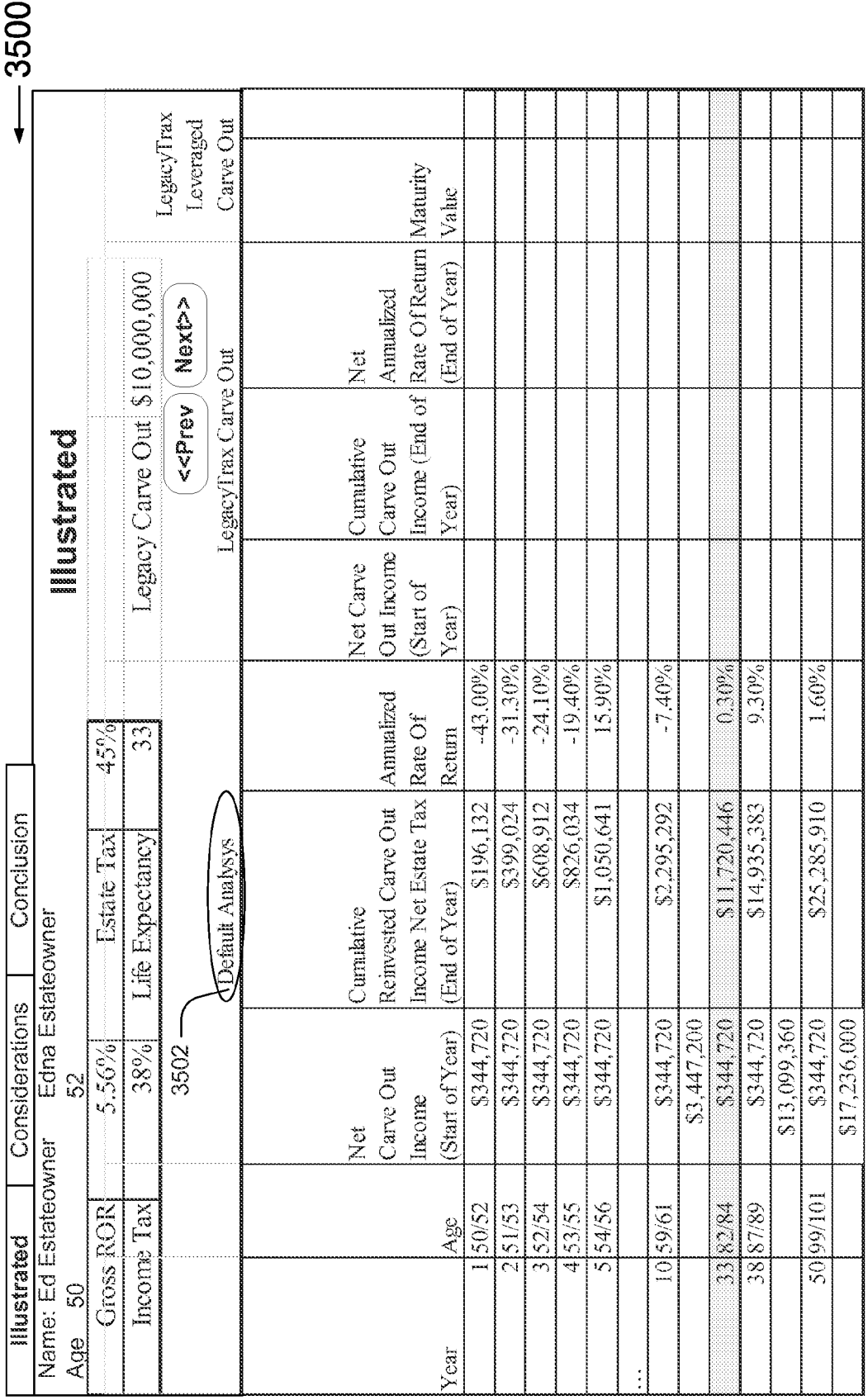
Figure 53:
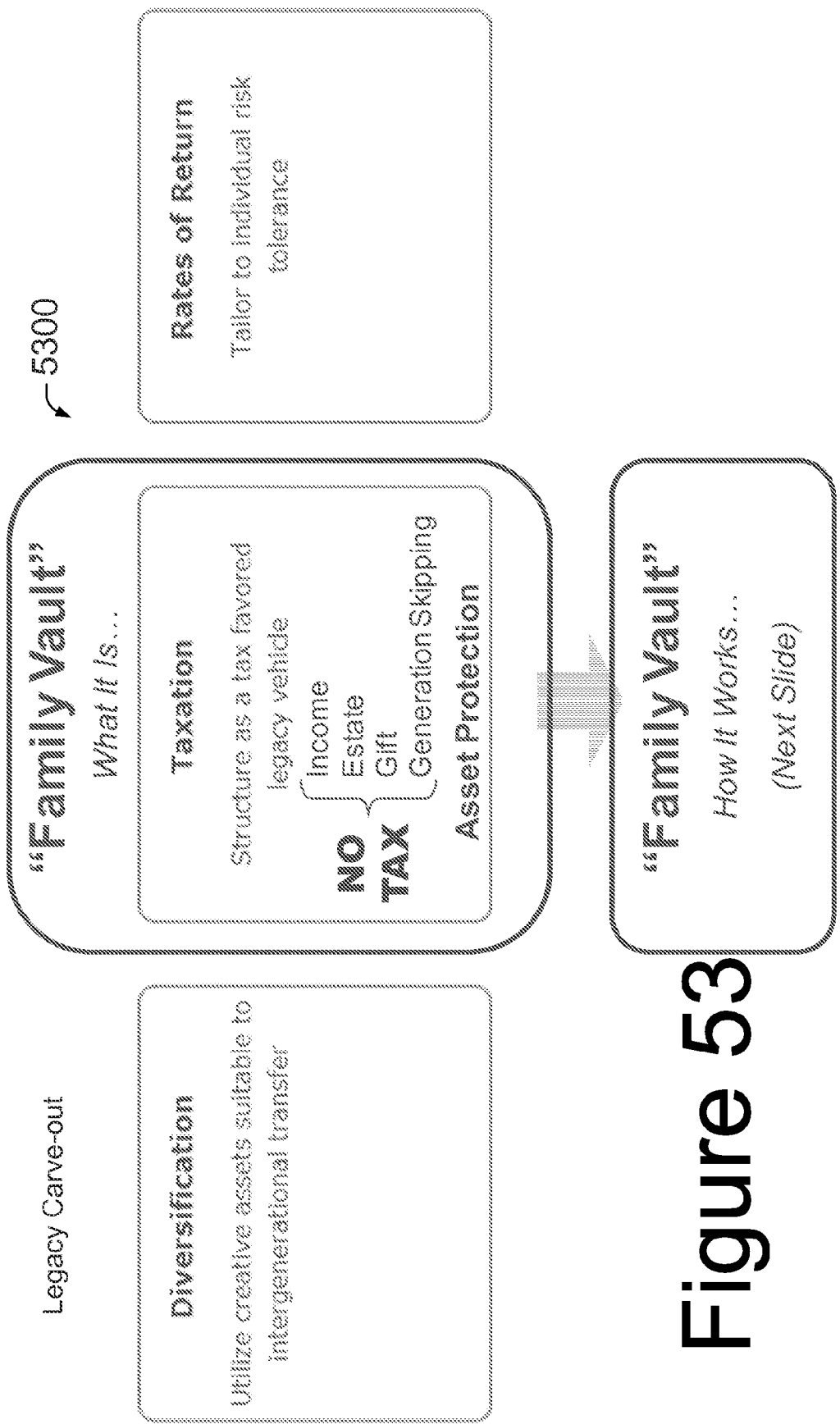
Figure 55:
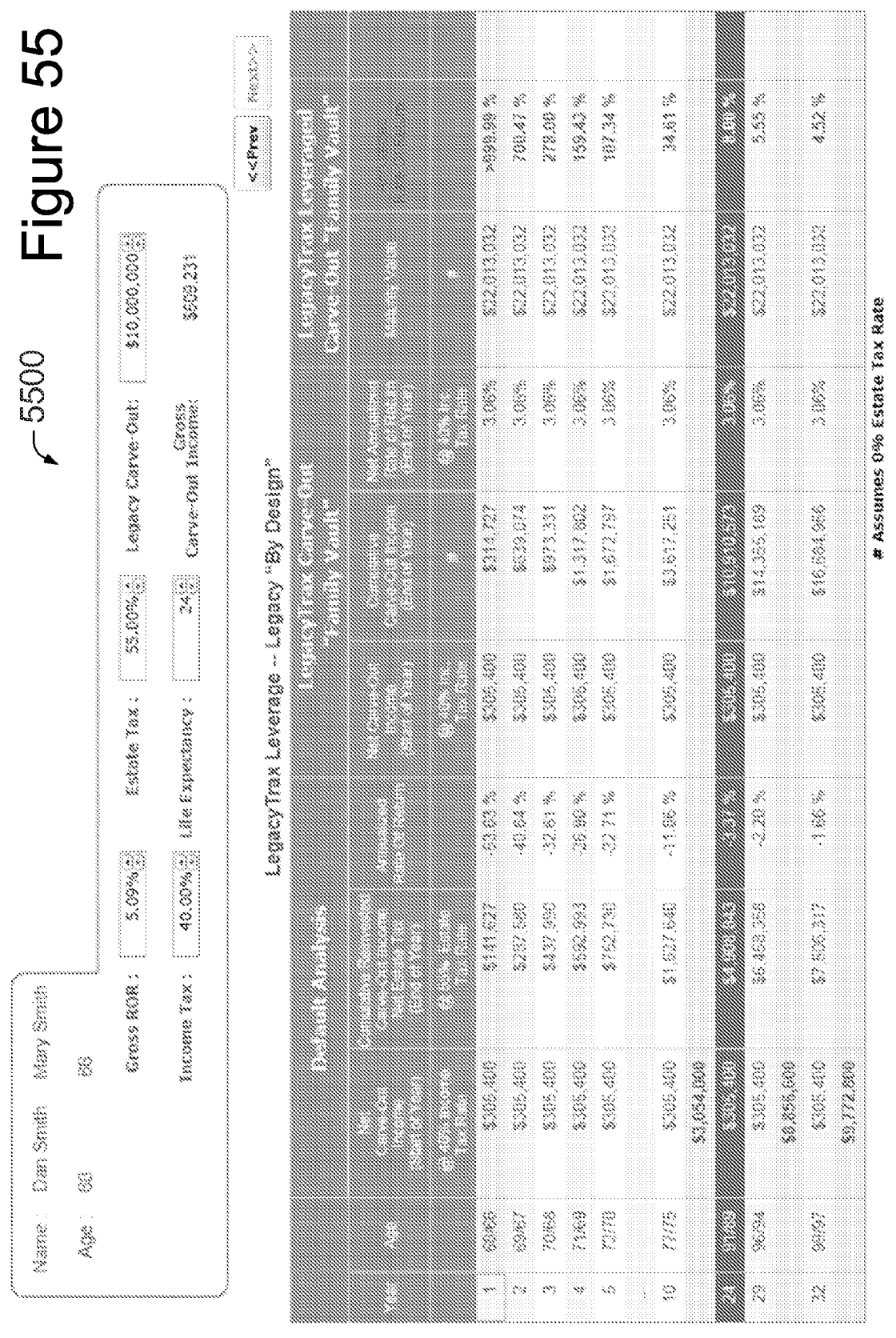

FIGS. 32 through 36 and 53-56 illustrate interfaces that facilitate rendition of an alternative approach to investing the carve out 314 where the conventional investment strategy results in an investment program assets that are sheltered from estate tax. In FIGS. 32, 33, 34, and 53 interfaces 3200, 3300, 3400, and 5300 respectively, illustrate dialog boxes informing Ed and Edna Estateowner that they can invest their assets differently for a more improved rate of return. In FIGS. 34 and 53, the diversification, taxation, and rate of return benefits are expounded upon and FIG. 54 indicates how a taxation structure can be executed. In FIG. 35, an interface 3500 shows a more condensed tabulation of the data in FIG. 31 under the column title "Default Analys[i]s" 3502. Referring to FIG. 36, an interface 3600 chronologically tabulates the amount of assets that Ed and Edna's heirs may receive for each of the Default Analysis 3502 and for an investment strategy that gives a 3.45% annual rate of return 3602 as before, however, the investment is structured to also be sheltered from estate tax (listed under the columns tilted "Legacy Trax Carve Out" 3604). For example, in year 1, if Ed and Edna invest $344,720 (element 3606) into, the now sheltered, conventional investment program, then Ed and Edna's heirs will receive $356,603 (element 3608) after Ed and Edna's death at year 1.

Figure 37:
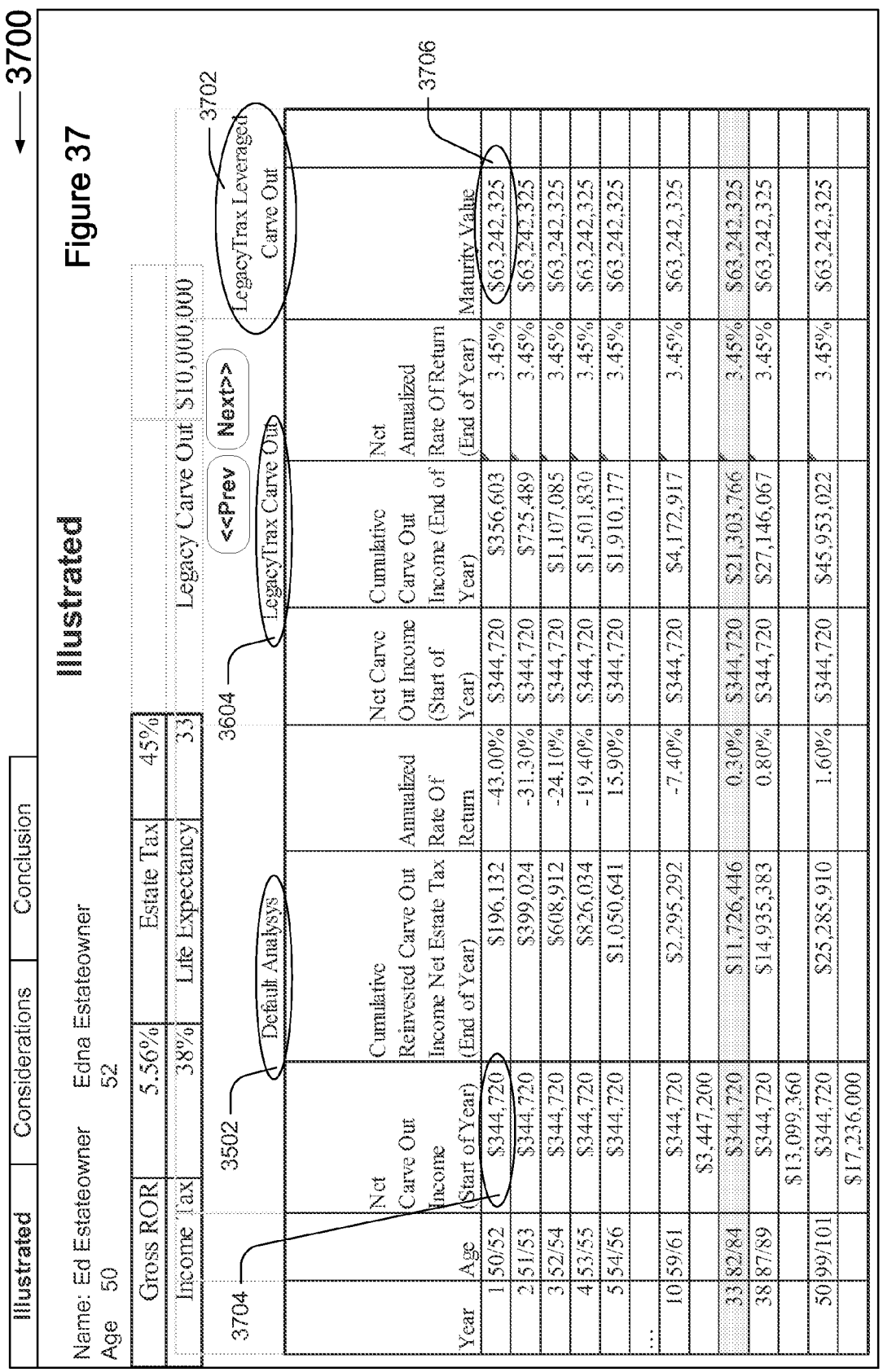
Figure 40:
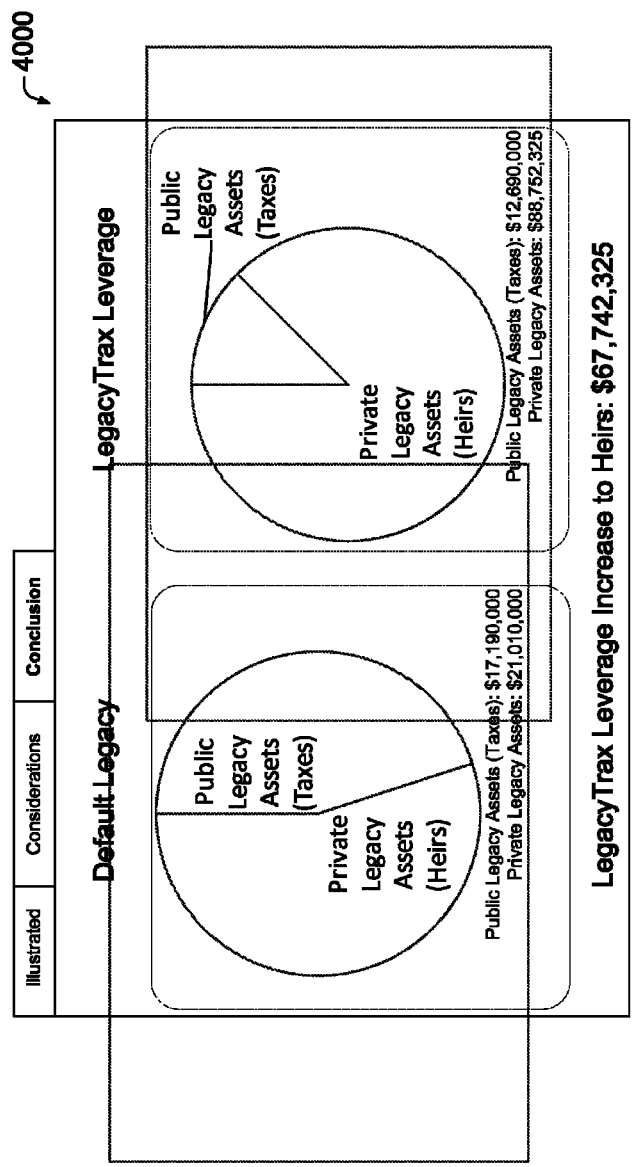

FIGS. 37 through 40 illustrate various interfaces, rendering the benefits of investing in a life insurance policy. In FIG. 37, interface 3700 shows a tabulation of asset transfer to Ed and Edna's heirs for each of three investment strategies: conventional investment (listed under the columns titled Default Analysis 3502), sheltered investment (listed under the columns titled Legacy Trax Carve Out 3604), and life insurance investment (listed under the columns titled Legacy Trax Leveraged Carve Out 3702). Here, the carve out 314 is investment in installments of $US344,720 (element 3704) as premiums toward a life insurance policy with a maturity value of $63,242,326 (element 3706). In FIG. 38, an interface 3800 illustrates the annual rate of return for investing the installments of the carve out 314 as premiums toward a life insurance policy with a maturity value of $63,242,325. For example, in year 1, the rate of return 3802 on the life insurance is over 999.99% and at the end of life expectancy of 33 years, the annualized rate of return 3804 is 8.70. Referring to FIG. 39, an interface 3900 illustrates a dialog box conveying the benefits of investing in a life insurance policy. FIG. 40 illustrates an interface for comparing the Public Legacy Assets 308 with the Private Legacy Assets 306 as pie charts for each of the Default Legacy and the Legacy Trax Leveraged.

Therefore, the advisor and client may review a plurality of differing financial scenarios each comprising a different allocation of Living Assets 302, Private Legacy Assets 306, and legacy carve outs 114, to achieve the client's optimal financial goals. After graphically reviewing a plurality of asset allocation scenarios, the client can identify a legacy carve allocation that the client will invest in a life insurance policy.

Figure 41:
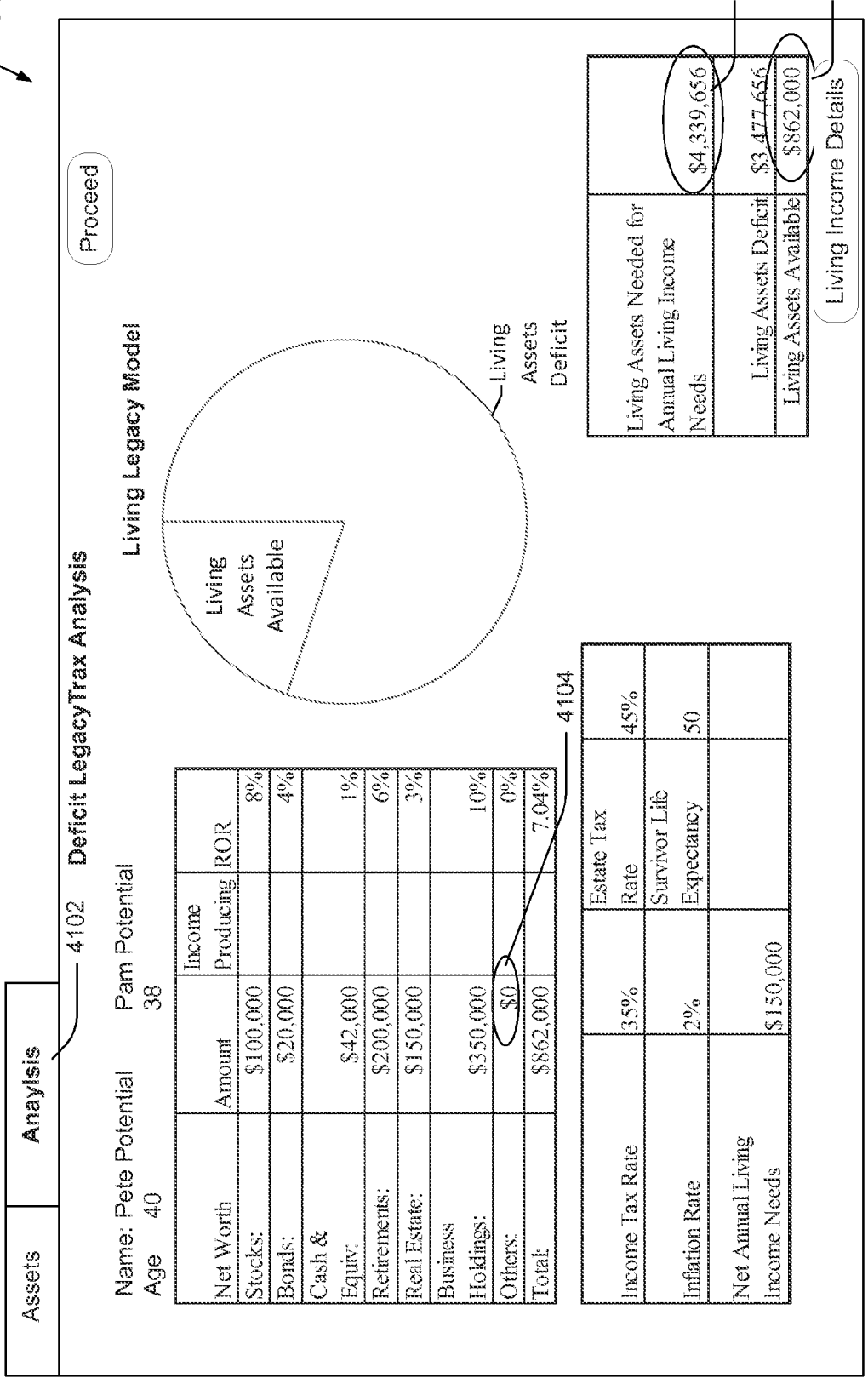
Figure 49:
Figure 52:
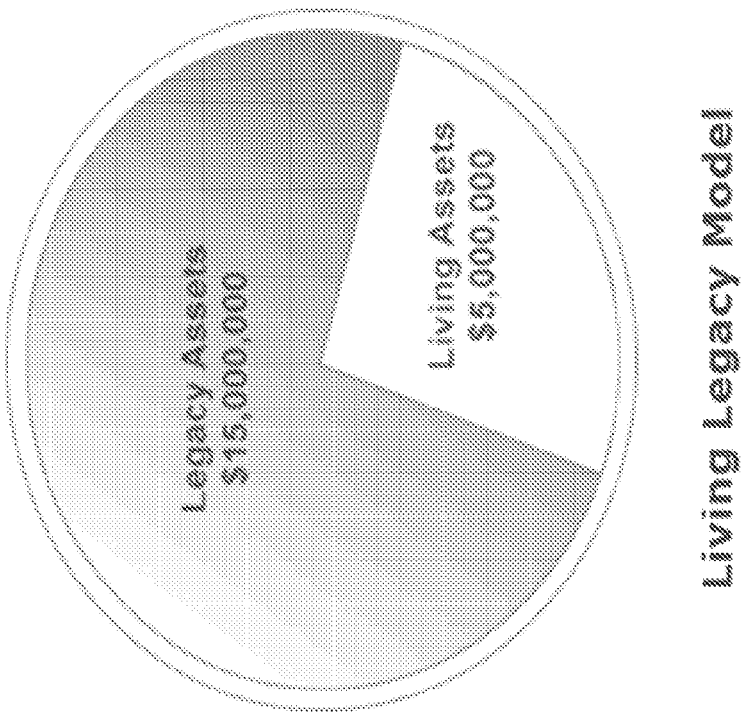

In FIGS. 41 through 45 various exemplary screen shots show investment strategies when the Legacy Assets 304 is less than zero (deficit). FIG. 41 illustrates an input interface 4100 for Assets 4102. As with FIG. 22, information about the assets of the asset holder is rendered in FIG. 41. Here, the total assets of the asset holders, Ed and Edna Estateowner, is worth $US862,000 (element 4104) while the Living Assets 302 of the asset holders is $US4,339,656 (element 4106). This results in a deficit of $US3,477,656 (element 4108). See also FIG. 44. FIG. 42 illustrates an interface 4200 for a tabulation of the Living Assets 302 broken down by year. In FIGS. 43 and 45, screen shots 4300 and 4500 show, respective, an interfaces including various strategies for overcoming the deficit in the Legacy Assets 304. The client learns that an investment in life insurance can indemnify the client's beneficiaries at a desired legacy value.

In FIGS. 46 through 51 illustrate various exemplary forms for collection of the information about the asset holders via a hard copy document. These forms may be used, for example, when the vendor does not have access to the vendor computing device 122 or the vendor computing device 122 may not be in communication with the network 104. The collected data can then be entered, at a later time, into the data repository 112, as would is known by those of ordinary skill in the art.

It should be understood that the present invention can be implemented in the form of control logic, in a modular or integrated manner, using software, hardware or a combination of both. In addition, screen displays of FIGS. 5-51, may be saved to memory, downloaded, and/or printed in hard copy form for later use and review. The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. For example, in certain implementations, individual steps recited in FIG. 2 or 4, may be combined, eliminated, or reordered.

In certain embodiments, Applicant's invention includes computer readable program code, such as computer readable program code 128 (FIG. 1), residing in a non-transitory computer readable medium, such as for example memory 112 (FIG. 1), wherein that computer readable program code is executed by a processor, such as processor 110 (FIG. 1), to perform one or more of steps recited in FIG. 2 and/or one or more of the steps recited in FIG. 4.

In other embodiments, Applicant's invention includes computer readable program code residing in any other computer program product, where those computer readable program code are executed by a computer external to, or internal to, device 106 (FIG. 1) to perform one or more of steps recited in FIG. 2 and or one or more of the steps recited in FIG. 4. In either case, the computer readable program code may be encoded in an information storage medium comprising, for example, a magnetic information storage medium, an optical information storage medium, an electronic information storage medium, and the like. By "electronic storage media," Applicant means, for example and without limitation, one or more devices, such as and without limitation, a PROM, EPROM, EEPROM, Flash PROM, compactflash, smartmedia, and the like Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods to implement the present invention.

It is understood that the examples and implementations described herein are for illustrative purposes only and that various modifications or changes in light thereof will be suggested to persons skilled in the art and are to be included within the spirit and purview of this application.

I claim:

1. An article of manufacture comprising a processor and a non-transitory computer readable medium having computer readable program code disposed therein to maximize a post-mortem asset disbursement, the computer readable program code comprising a series of computer readable program steps to effect:
    receiving information about one or more assets owned by an asset holder, wherein liquid assets are separately identified and input from non-liquid assets;
    selecting a life expectancy from the group consisting of a single life, a joint life, and both a single life and a joint life;
    setting, based on a life expectancy period for the selected life expectancy and an expected aggregate expenditure of the asset holder over the life expectancy period;
    calculating a first investment corpus comprising the difference between a value for said one or more assets and said expected aggregate expenditure;
    calculating a first investment corpus life expectancy value for the first investment corpus;
    calculating a first estimated post-mortem tax liability imposed on said first investment corpus life expectancy value;
    setting a value for carve out funds deducted from the first investment corpus, wherein said carve out funds take into account both gift tax and estate tax exclusions;
    calculating a second investment corpus comprising the difference between said first investment corpus and said carve out funds;
    calculating a second investment corpus life expectancy value for the second investment corpus;
    calculating a second estimated post-mortem tax liability imposed on said second investment corpus life expectancy value; and
    determining a value for life insurance proceeds paid at end of life expectancy, wherein said life insurance proceeds are realized from a life insurance policy covering said asset holder and purchased using said carve out funds.

2. The article of manufacture of claim 1, wherein the computer readable program code further comprises a series of computer readable program steps to further effect:
    calculating a first return on investment using said first investment corpus life expectancy value and said first estimated post-mortem tax liability; and
    calculating a second return on investment using said second investment corpus life expectancy value, said value for said life insurance proceeds, and said second estimated post-mortem tax liability.

3. The article of manufacture of claim 2, wherein the computer readable program code further comprises a series of computer readable program steps to further effect:
    calculating a return on investment differential comprising the difference between said second return on investment and said first return on investment; and
    adjusting the value of said carve out funds to maximize the value of said return on investment differential.

4. The article of manufacture of claim 1, wherein the computer readable program code further comprises a series of computer readable program steps to further effect calculating projected private legacy assets and public legacy assets at a specified growth rate over a specified number of years using said selected life expectancy.

5. The article of manufacture of claim 1, wherein the computer readable program code further comprises a series of computer readable program steps to further effect increasing said carve out funds by a percentage of Outright Gift Discount Transfer.

6. The article of manufacture of claim 1, wherein the computer readable program code further comprises a series of computer readable program steps to further effect:
    calculating a maturity value for a specified amount of funds;
    calculating a carve-out value required to generate after tax carve-out income that would generate said maturity value.

7. The article of manufacture of claim 1, wherein the computer readable program code further comprises a series of computer readable program steps to further effect selecting whether to calculate a deficit analysis based upon a principal as survivor or based upon a spouse as survivor.

8. A computer program product encoded in a non-transitory computer readable medium, said computer program product being useable by a programmable computer processor to maximize a post-mortem asset disbursement, comprising:
    computer readable program code which causes said programmable computer processor to receive information about one or more assets owned by an asset holder, wherein liquid assets are separately identified and input from non-liquid assets;
    computer readable program code which causes said programmable computer processor to select a life expectancy from the group consisting of a single life, a joint life, and both a single life and a joint life;
    computer readable program code which causes said programmable computer processor to set, based on a life expectancy period for the selected life expectancy and an expected aggregate expenditure of the asset holder over the life expectancy period;
    computer readable program code which causes said programmable computer processor to calculate a first investment corpus comprising the difference between a value for said one or more assets and said aggregate expenditure;

computer readable program code which causes said programmable computer processor to calculate a first investment corpus life expectancy value for the first investment corpus;

computer readable program code which causes said programmable computer processor to calculate a first estimated post-mortem tax liability imposed on said first investment corpus life expectancy value;

computer readable program code which causes said programmable computer processor to set a value for carve out funds deducted from the first investment corpus;

computer readable program code which causes said programmable computer processor to calculate a second investment corpus comprising the difference between said first investment corpus and said carve out funds;

computer readable program code which causes said programmable computer processor to calculate a second investment corpus life expectancy value for the second investment corpus;

computer readable program code which causes said programmable computer processor to calculate a second estimated post-mortem tax liability imposed on said second investment corpus life expectancy value; and computer readable program code which causes said programmable computer processor to determine a value for life insurance proceeds paid at end of life expectancy, wherein said life insurance proceeds are realized from a life insurance policy covering said asset holder and purchased using said carve out funds.

9. The computer program product of claim 8, further comprising:

computer readable program code which causes said programmable computer processor to calculate a first return on investment using said first investment corpus life expectancy value and said first estimated post-mortem tax liability; and computer readable program code which causes said programmable computer processor to calculate a second return on investment using said second investment corpus life expectancy value, said value for said life insurance proceeds, and said second estimated post-mortem tax liability.

10. The computer program product of claim 9, further comprising:

computer readable program code which causes said programmable computer processor to calculate a return on investment differential comprising the difference between said second return on investment and said first return on investment; and computer readable program code which causes said programmable computer processor to adjust the value of said carve out funds to maximize the value of said return on investment differential.

11. The computer program product of claim 8, further comprising computer readable program code which causes said programmable computer processor to increase said carve out funds by a percentage of Outright Gift Discount Transfer.

12. The computer program product of claim 8, further comprising computer readable program code which causes said programmable computer processor to calculate projected private legacy assets and public legacy assets at a specified growth rate over a specified number of years using said selected life expectancy.

13. The computer program product of claim 8, further comprising:

computer readable program code which causes said programmable computer processor to calculate a maturity value for a specified amount of funds;

computer readable program code which causes said programmable computer processor to calculate a carve-out value required to generate after tax carve-out income that would generate said maturity value.

14. The computer program product of claim 8, further comprising computer readable program code which causes said programmable computer processor to select whether to calculate a deficit analysis based upon a principal as survivor or based upon a spouse as survivor.

* * * * *